United States Patent [19]

Fan

[11] Patent Number: 4,930,077
[45] Date of Patent: May 29, 1990

[54] INFORMATION PROCESSING EXPERT SYSTEM FOR TEXT ANALYSIS AND PREDICTING PUBLIC OPINION BASED INFORMATION AVAILABLE TO THE PUBLIC

[76] Inventor: David P. Fan, 2115 Dudley, St. Paul, Minn. 55108

[21] Appl. No.: 35,080

[22] Filed: Apr. 6, 1987

[51] Int. Cl.$^5$ .......................................... H04M 11/00
[52] U.S. Cl. ...................................... 364/419; 379/92
[58] Field of Search ................... 364/419, 402; 358/84; 379/92; 455/2

[56] References Cited

U.S. PATENT DOCUMENTS

| | | | |
|---|---|---|---|
| 3,950,618 | 4/1976 | Bloisi | 379/92 |
| 4,320,256 | 3/1982 | Freeman | 379/92 |
| 4,603,232 | 7/1986 | Kurland | 379/92 |
| 4,745,468 | 5/1988 | Von Kohorn | 358/84 |
| 4,745,549 | 5/1988 | Hashimoto | 364/402 |

OTHER PUBLICATIONS

Fan, Ideodynamics Production for the Evolution of Lubits, 1985, pp. 265–281.
Fan, Ideodynamics: The Kinetics of the Evolution of Ideas, 1985, pp. 1–23.
Fan, Math. Inodels for the Impact of Information on Society, 1984, 479–493.
Weber, Banz Contact Concept, 1985.

Primary Examiner—Allen MacDonald
Assistant Examiner—Kim Thanh T. Bui
Attorney, Agent, or Firm—Merchant, Gould, Smith, Edell, Welter & Schmidt

[57] ABSTRACT

A method and system for text analysis provides that text messages perceived by a population can be scored to determine the extent to which the messages favor one or more specified positions on a specified issue. A method and system for predicting public opinion based on message scores provides that the extent to which messages favor one or more specified positions can be used to determine the effect on the opinions of a specified population and to determine changes in the percentages of the percent of subpopulations within said specified population which favor said one or more specified positions.

110 Claims, 3 Drawing Sheets

4,930,077

INFORMATION PROCESSING EXPERT SYSTEM FOR TEXT ANALYSIS AND PREDICTING PUBLIC OPINION BASED INFORMATION AVAILABLE TO THE PUBLIC

TECHNICAL FIELD OF THE INVENTION

This invention generally concerns an expert system in artificial intelligence in which a computer performs scoring of information available to the public and uses such scores to predict expected public opinion.

BACKGROUND OF THE INVENTION

One of the major areas of this invention is the computer analysis of text. Here, "text" refers to a stream of data bits. Individual data bits will be referred to as "characters" and will typically be ASCII (American Standard Code for Information Exchange) characters. Small strings of such data bits are grouped into units called "words" with each word having a small number of defined meanings. Unless otherwise stated, words need not begin and end with special characters like spaces, carriage returns or line feeds.

In some expert systems for computer text analysis, words in text are assigned to defined categories and the number words in each category is counted. Final interpretations are based on the frequencies of words in different categories. Although this strategy is suitable for analyzing large quantities of text ranging to millions of characters or more, meanings due to relationships between words are lost.

Other expert systems include the spatial relationships between words in the test analysis. This strategy has the disadvantage that only limited amounts of text can be examined without the rules for assessing word relationships becoming exceedingly complex and very time consuming to compute.

In addition, no general and systematic method has been propsed in either of these areas of artificial intelligence to obtain directly numerical scores for the extent to which a "story" supports different "positions" for an "issue." Here, an issue is basically a question such as: should there be More, Same, or Less spending for military defense. A position, also called an "idea," is a possible answer such as: More, Same, Less or Don't know. A story is a continuous segment of text.

The other major area of this invention concerns the determination of expected public opinion, and, more generally, the determination of expected social traits. Previous attempts to develop an artificial intelligence system for predicting public opinion are described in two previous publications: "Mathematical models for the impact of information on society," by David P. Fan in *Political Methodology*, Vol. 10, pp. 479–493, 1984; and "Ideodynamics: The kinetics of the evolution of ideas," by David P. Fan in *Journal of Mathematical Sociology*, Vol. 11, pp. 1–23, 1985. This system was based on a model called ideodynamics.

In ideodynamics, expected opinion is computed from scores for the extent to which information supports different positions. Expected opinion is determined as a time trend with the time intervals of the determinations being of arbitrarily small size.

For the opinion computations in the prior system, each persuasive message able to change minds of people in a population was defined as an "infon" $I_{ijk}$ where $i=1,2$ was the index referring to whether the infon was available to all people ($i=1$) or only those already aware of the issue ($i=2$) supported a position, where $j=1,2$ was the index referring to the position (denoted by $Q_j$) the infon favored, and where k was the index identifying the individual message. Each infon was defined to have the characteristics of $t_{ijk}$=the time the infon first arrived at the population, $a_{ijk}$=the fraction of the audience reached immediately after the infon was sent, $v_{ijk}$=the credibility of the infon, $c_{ijk}$=the fraction of the infon favoring idea $Q_j$ and $d_{ijk}(t)$=function describing the fraction of the population accessing the infon at time t.

For opinion formation, equations describing the effects of infons from the mass media on the population were $$d_{ijk}(t) = e^{-p_{ijk}(t-t_{ijk})} \text{ for } t >= t_{ijk} = 0 \text{ for } t < t_{ijk} \quad (1)$$

where $p_{ijk}$ is constant, $$f_{ijk}(t) = a_{ijk} \cdot c_{ijk} \cdot d_{ijk}(t), \quad (2)$$

$$F_{ij}(t) = \sum_k f_{ijk}(t) \quad (3)$$

for all k with $t_{ijk} < t$, $$g_{ijk}(t) = \int_{-\infty}^{t} f_{ijk}(t') \cdot A(t') \cdot e^{-m(t-t')} dt', \quad (4)$$

where $A(t')$ is the fraction of the population aware of the issue at time $t'$, $$G_{ij}(t) = \sum_k g_{ijk}(t) \quad (5)$$

for all k with $t_{ijk} < t$, $$H_j = G_{.j}/(G_{..} + w) \quad (6)$$

where w is a weighting constant, and $$dB/dt = k_2(1-B) \cdot H_{.1} - k_2 B \cdot H_{.2} \quad (7)$$

where B is the fraction of the population believing in position $Q_1$ given by subscript $j=1$ assuming that there was only one other posible position ($Q_2$) opposed to idea $Q_1$.

The previous ideodynamic system suffered from several drawbacks rendering it inoperable. First, an infon was defined as "a single packet of information transmitted in identical copies to a group of people" (the article by Fan in the Journal of Mathematical Sociology, 1985, described above). Since each infon is defined as $I_{ijk}$ with only one index j, the implication is that an infon can only support the single position $Q_j$. However, in defining content scores $c_{ijk}$, there is the implication that an infon can have contents supporting more than one position. Therefore, there is contradiction in the terms defined earlier.

In the system of this invention, "a single packet of information transmitted in identical copies to a group of people" is redefined as a "persuasive message" with an "infon" $I_{ijk}$ now referring to "a component of a message favoring position or idea $Q_j$." In fact, it is possible to divide a message into several infons all favoring the same position $Q_j$. All such infons would have the same subscript j but would have different subscripts i and/or k.

Second, all persuasive messages were assumed to have the same total content score since the content score $c_{ijk}$ for any one position was only the fraction of the message favored by infon $I_{ijk}$. This interpretation gives excessive weights to persuasive messages with very little information relevant to the issue. Therefore, the result will be highly inaccurate opinion determinations.

In this invention, $c_{ijk}$ is redefined as the total and not the fractional content of infon $I_{ijk}$ favoring position $Q_j$.

Third, the prior equation for opinion determination (equation 7) did not include the case of an issue having more than the two positions of pro and con.

In this invention, a new equation is used where any number of positions is possible. The extension to more positions could have resulted from a number of different assumptions so the formulation in this invention cannot be directly deduced from the prior system.

Fourth, the equations in the systems of this invention no longer include the term $d_{ijk}(t)$. Also, the constant $a_{ijk}$ is redefined as $a_{ijk}(t)=$ a function of time including features from both $a_{ijk}$ and $d_{ijk}(t)$ in the previous formations of equations 1-7.

Fifth, equation 6 is now replaced by a totally new equation in which constant w is eliminated and in which $G_{..}$ no longer appears. The replacement equation is not a natural extension of equation 6 since the new constants have no relation to constant w in equation 6. With this invention no longer using constant w, the entire sketch for the solution of equations 1-7 in the prior system is inoperative since that sketch required finding constant w.

Sixth, the prior system did no permit messages favoring different positions to have different abilities to cause opinion change. The possibility is now included by the introduction of constants $w_{ij'j'}$ (see equation A.29 of step III-4 of the Preferred Embodiment below).

Seventh, the prior system did not specify the method for solving differential equation 7 including the setting of the boundary conditions so that system did not give a complete description of the opinion determination.

SUMMARY OF THE INVENTION

Disclosed is a system for using an electronic computer to determine expected social traits, and in particular, public opinions for the specified positions of a specified issue based on information available to the public. The three basic stages of the system involve: the gathering of representative messages relevant to the issue over a period of time, the generation of numerical scores for the messges, and the use of the scores to determine time trends of public opinion throughout the time period for which the messages are available. The preferred messages are in the form of text which can be retrieved from electronic data bases. The system first provides a method to score text using an electronic computer. The system then determines expected opinion from changes in opinion due to the influence of the messages as represented by their numerical scores.

DESCRIPTION OF THE PREFERRED EMBODIMENT

Figure 1:
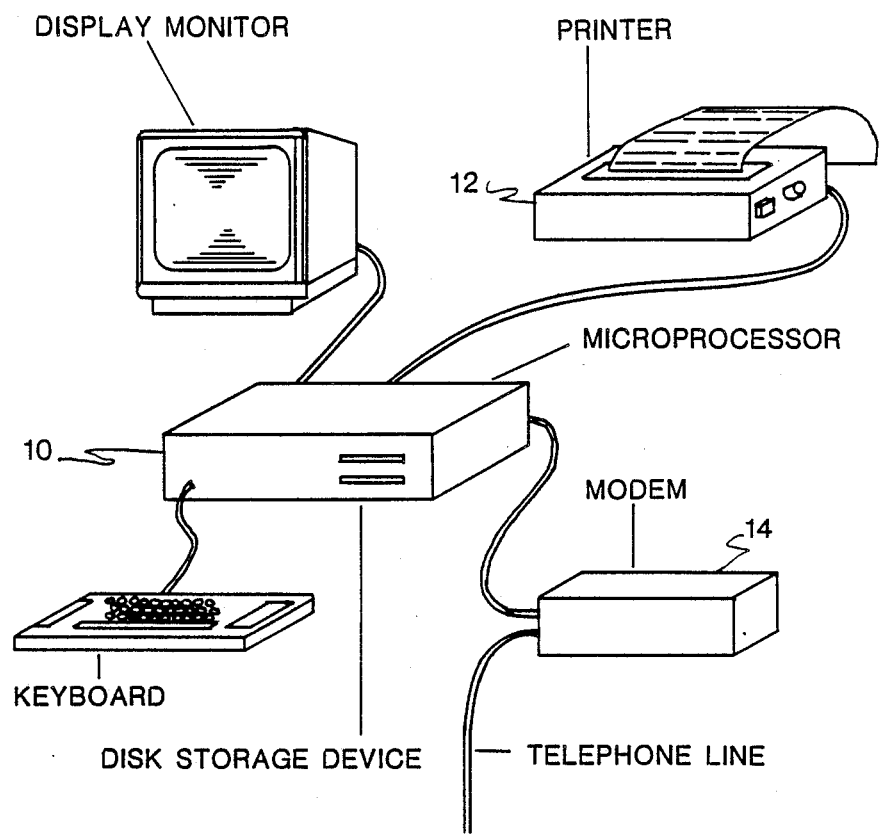
FIG. 1 is a perspective view of the electronic computer and peripheral devices used for this invention.

The invention will now be described as embodied in the computer system shown in FIG. 1 with a human operator at the controls. This system comprises a computer 10, preferably compatible with the IBM-PC microcomputer, a printer 12, preferably the Hewlett-Packard Thinkjet printer, and a modem 14. The printer 12 and modem 14 are attached to the computer 10 with the modem being further connected to remote devices by a telephone line. The computer comprises a keyboard by which the operator can enter data, a display monitor for displaying information, a disk storage device, and a microprocessor with a random access memory and a process execution unit. The microprocessor can store information by writing the information to disks using the disk storage device. The microprocessor can then read the stored information using the disk storage device. The computer can also send information to and receive information from the modem.

A typical complete task as the invention is applied to determine public opinion is now described with reference to FIG. 1. It will be understood, however, that the invention is also applicable to the more generalized task of determining social traits as will be discussed further below. In operation, the system operator passes commands and data to the computer using the keyboard. The computer accomplishes the task following commands given by the operator. Those commands include instructions for the computer to load and execute appropriate programs stored on disk. The data used by the computer come from the keyboard and from the modem. Usually, the computer will store the data on disk before subsequently reading that information from disk for the processing steps.

The goal of the typical task is to use information in the Associated Press (AP) wire service to determine expected public opinion for a number of specified positions all relating to a specified issue. The background theory for this embodiment and additional details of the techniques and results are presented in the book manuscript appended hereto and hereby made a part hereof. To avoid confusion with appendices in this manuscript, this patent does not refer to the manuscript written by David Fan in 1987 as an appendix but rather as: Fan (1987).

The task is divided into three main sections discussed below in steps I, II, and III. Step I is to gather AP dispatches. Step II is to score the dispatches numerically for the extent to which different components support different positions. Step III is to use these numerical scores to determine public opinion.

I. Gathering of AP dispatches (I-1) in order to gather appropriate AP stories, it is first necessary to define the issue for which opinion is to be determined and the mutually exclusive positions within that issue. The positions are defined so that an individual member of the population can have an opinion favoring only one of the defined positions. The possible positions are denoted by $Q_j$ where j indexes the individual positions.

Consider, as example, the issue: "Should American defense spending be increased, kept the same, or decreased?" The three positions within this issue could be: should be increased, should be kept the same, should be decreased. With three positions, j=1,2,3 in the term $Q_j$. For brevity, it is convenient to refer to these three positions as $Q_1$ favoring More defense spending, $Q_2$ favoring Same defense spending, and $Q_3$ favoring Less defense spending. In actual polls, members of the public were assigned by polling organizations as holding one of these three positions (see Table B.1 of Fan, 1987).

In a addition to positions $Q_1$, $Q_2$, and $Q_3$, poll results also included the additional position of No Opinion typically comprising less than 10% of the population. With this small percentage, persons with No Opinion were ignored. This action was equivalent to assuming that most of these persons did not participate in decision making on the issue and continued to have No Opinion. However, it would be possible to repeat the analysis with No Opinion as yet another position.

(I-2) After the issue and its positions are defined, the system operator uses the computer and modem to communicate with a remote storage device, also called a data base, containing the full texts of stories in the AP wire service. One example is the Nexis data base sold by Mead Data Central of Dayton, Ohio. The computer passes a search command to the data base instructing the data base to identify all stories relevant to the issue under analysis.

For the issue of defense spending analyzed in Fan (1987), the search command was: (DEFENSE or MILITARY or ARMS) w/5 (BUDGET! or EXPENDITURE or SPEND! or FUND!) and date aft 1/1/77 and date bef 4/1/84. A full explanation of this command is given in Section B.1 of Fan (1987).

After receiving a search command, the Nexis data base responds with the total number of stories found. All stories are numbered in reverse chronological order. The computer then chooses a series of random numbers with the length of the series being less than or equal to the total number of stories identified by the data base. The computer passes appropriate commands to the data base to retrieve the texts of the stories with numbers corresponding to those in the random number series. The computer retrieves the text using the modem and stores the material on disk.

(I-3) The computer reads the retrieved text for a story from disk into memory and edits the text to remove extraneous characters and to convert the date into a "decimal date." For this conversion, it is useful to note that all stories retrieved from the Nexis data base begin with introductory material. This introductory text includes the date of story, preceded by a characteristic string of characters, usually the ASCII characters ESCAPE-A1. The computer scans the text until this string is reached. Then the computer reads the next continuous string of letters as the month (e.g. January), skips irrelevant characters, reads the next integer as the date (e.g. 1), skips irrelevant characters, and then reads the following integer as the year (e.g. 1987).

The computer checks the string of characters comprising the month against an array of 12 words corresponding to the 12 months of the year. Upon finding a match, the computer adds the integer corresponding to the date and the integer corresponding to the number of days in the year before the beginning of the matching month. The computer divides the resulting sum by the total number of days in the year to get a fractional year. The computer adds this fractional year to the last two digits of the year to get the decimal date representing the date in terms of the fraction of the year which had elapsed.

As an example, the decimal date for Jan. 1, 1987 would be 87.0027 where 0.0027=(1+0)/365. Here, the date is 1 and the integer from the month is 0 since there are no months before January.

The computer then continues to remove extraneous characters from the text. These characters are not part of the text itself but are added by the data base. For instance, the Nexis data base also sends the ASCII character string ESCAPE-A1 just prior to any word in the text which corresponded to a word in the search command (e.g. ARMS in the example in step I-2).

Whenever three adjacent spaces are encountered, the computer replaces the three spaces by the symbol "!" to indicate the beginning of a paragraph. When the computer reaches the end of a story, the computer writes the edited story to disk. For this step, the computer writes in order: the symbol "*" to indicate the beginning of the story, the decimal date, and then the rest of the edited text.

The following is the edited text from a hypothetical AP story:

* 87.0027
!"Funding for the Marines and non-defense items should not be cut," he said.
!He did ask for a reduction in health care spending.

Optionally, the system operator examines the edited text and performs a final manual editing to assure that all stories begin with the "*" symbol and the decimal date and that the paragraphs all being with the "!" symbol.

The editing is performed for every retrieved story. The result is a new set of files on disk containing the edited texts of all stories retrieved from the data base.

II. Computer assisted content analysis

Once relevant stories have been collected and edited in step I above, the task continues with computer text analysis to generate set of numerical scores. In outline, this analysis begins with a series of "text filtration" steps where the computer removes text irrelevant to the opinions being determined. Once the text is sufficiently homogeneous for scoring, the computer proceeds to the "text scoring" step. The filtration and scoring procedures are described in steps II-A and II-B below, respectively.

II-A. Text filtrations (II-A1) Based on a random sample of edited stories, "filtration criteria" are developed. These criteria are used to formulate a "text analysis dictionary" and a set of customized "text filtration rules" for "filtering text," that is, for discarding text irrelevant to the issue being analyzed. The text filtration rules are comprised of two parts: a set of "text transformation rules" and a set of "text filtration rules." The text analysis dictionary and filtration rules are stored on disk.

Consider, for example, the defense spending issue of step I-1 above. For this topic, it is possible to decide that only one filtration criterion is needed. This condition could be the removal of all paragraphs except those relating directly to "American defense spending." This criterion could be implemented using the text analysis dictionary and text filtration rules those presented below. The rationales and compositions of the dictionary entries and the rules will be discussed below.

(II-A2) The computer loads the text analysis dictionary from disk into memory. The dictionary has two parts, a "concept array" and a "dictionary array."

The concept array lists all the essential concepts needed for the text text analysis. Each element of the concept array is comprised of:

(a) a unique "concept symbol" made up of a single character in the ASCII set of characters, and (2) a unique "concept mnemonic" made up of a string of ASCII characters sufficiently long to suggest the meaning of the concept.

In the text filtration to select for paragraphs relevant to "American defense spending" (the criterion of step II-A1 above), the concept array could be Table 1.

TABLE 1

| Concept array for text analysis dictionary | |
|---|---|
| Concept mnemonic | Concept symbol |
| AmericaWord | A |
| DefenseWord | d |
| SpendingWord | s |
| AmerDefense | b |
| AmerDefSpend | + |
| NonPrefix | n |

The dictionary array of the text analysis dictionary is comprised of a number of specified words. Each word is associated with one of the concepts in the concept array. Therefore, each word has a corresponding concept mnemonic and concept symbol.

Returning to the example of the text filtration for "American defense spending," the dictionary array might include the entries in Table 2. Here, only the concept symbol is given since the concept mnemonic can be read from Table 1.

TABLE 2

| Dictionary array for text analysis dictionary | |
|---|---|
| Dictionary word | Concept symbol |
| America | A |
| U.S. | A |
| defense | d |
| funding | s |
| budget | s |
| Marine | b |
| non | n |

In this example, the concept of "American" would have concept symbol "A" and concept mnemonic "AmericaWord." The words "America" and "U.S." could both belong to this concept. However, not every concept need have corresponding words in the dictionary. For example, the concept of "American defense spending" could have concept symbol "+" together with concept mnemonic "AmerDefSpend" and yet not be represented by any single word.

(II-A3) Besides loading the dictionary, the computer loads the text transformation rules from disk into memory. These rules are comprised of:

(a) Initiation and termination signals for "blocks of text." These signals are strings of characters. The computer scans for the first occurrence of an initiation signal after the decimal date. The computer marks this as the beginning of a block of text. The computer marks the first following termination signal as the end of the that block of text. The block of text itself is the text between the two signals.

For the sample edited text of step I-3 above, it is possible to discard irrelevant paragraphs in which case the appropriate blocks of text would be paragraphs. Therefore, the "!" would be the only permissible initiation signal since all paragraphs in the edited text begin with this symbol.

However, there would be two possible termination signals, the character "!" marking the beginning of a following paragraph and the end of story marker described in step II-A5 below. Therefore, the "!" can mark both the end of one block of text and the beginning of the next.

It is also possible to use other initiation and termination signals. For example, the "!" signal marking the beginnings of paragraphs could still be used as the initiation signal for discarding entire stories. In this case, the end of story maker would be the only permissible termination signal. Intervening appearances of "!" would not cause the block of text to end.

(b) Specified carryover symbols. These symbols are a subset of all the concept symbols of step II-A2 above (see step II-A18 below for their use).

(c) Text equivalent transformation rules. These rules are a set of individual transformation rules (see step II-A15 below for their use).

(II-A4) Besides the text analysis dictionary and text transformation rules, the computer also loads the text filtration rules from disk into memory. These rules are comprised of:

(a) a set of "text discard symbols" with each element comprised of a concept symbol which would lead to discarding a block of text, and (b) a set of "text retention symbols" with each element comprised of a concept symbol which would lead to retaining a block of text.

(II-A5) After loading the dictionary and corresponding text transformation rules, the computer loads the text of a specified story into memory, placing an end of story mark in the memory unit following the end of the story. In a disk file containing more than one story, the "*" symbol just before the decimal date of the next story (see example of step I-3) would delimit the end of the previous story. Alternatively, the end of the disk file would signal the end of a story.

(II-A6) The computer reads the "*" and decimal date at the beginning of a story and writes this information to two separate disk files, a "full text output file" and a "filtered text output file." The computer then scans the text until it encounters the first initiation signal and places a "current begin block of text" marker at the beginning of this signal.

(II-A7) The computer also places a "current position" marker at the next character.

In the example in step I-3 above, the mark is on the quote sign immediately after the first "!."

(II-A8) The computer marks the first word in the text analysis dictionary as the "current dictionary word."

(II-A9) The computer prepares a "candidate word" comprising of a string of characters in the text of the story beginning with the current position mark and extending into the text until the length current dictionary word is reached or until a termination signal is encountered. The computer compares the candidate word with the current dictionary word. In making the comparisons, all letters are reduced to the lower case. Carriage returns and line feeds are considered to be the equivalent of a space.

(II-A10) If there is no match in step II-A9 above, the computer moves the current dictionary word marker to the next word in the dictionary and repeats step II-A9. This repetition is continued until either a match is found or the end of the dictionary is reached.

(II-A11) If there is a match in either step II-A9 or step II-A10 above, the computer inserts into the text the following three characters just before the position of the match:

(a) the control character "<" indicating the arrival of a concept symbol, (b) the concept symbol of the matching dictionary word, and (c) the control character "<" indicating the end of the concept symbol.

(II-A12) After step II-A11, the computer advances the current position marker to the next character in the text and repeats steps II-A8 to II-A11. The computer continues this repetition until a termination signal is reached. The text between the current begin block of text marker and this termination signal, including the character additions of step II-A11, is considered to be the "current block of text." At this point, the current block of text from the example of step I-3 above is:

!"<2>Funding for the <b>Marines and <n>non-<d>defense items should not be cut," he said.

The computer writes the current block of text to the display monitor to permit the system operator to follow the progress of the text analysis.

(II-A13) The computer constructs a "text equivalent" for the current block of text comprised of an alternating series of elements: a "diagnostic symbol" and a "diagnostic distance:"

(a) The "diagnostic symbol" is comprised of either the symbol "*" denoting the beginning of the block of text or a concept symbol inserted in step II-A11 above.

(b) The "diagnostic distance" is an integer equivalent to the number of characters between two concept symbols in the block of text, between a concept symbol and the beginning or end of the block of text, or between the beginning and end of the block of text if no concept symbols were placed in the block of text.

The computer constructs the text equivalent, stores it memory and displays it on the monitor as follows:

(a) The computer writes to the monitor the diagnostic symbol "*" indicating the beginning of the block of text. The computer then writes a space. At this point, the computer starts at the beginning of the block of text, after the initiation signal, and counts characters up to but not including the first "<" character or the termination signal for the block of text, whichever is reached first. This number of characters is the first diagnostic distance. The computer writes the diagnostic distance followed by a space.

(b) If a "<" has been reached, the computer then writes the next character, the concept symbol of the following word, as next diagnostic symbol. The computer again writes a space and skips the following "<" and counts characters to the next "<" or termination signal. The computer then enters that number as the next diagnostic distance.

(c) Step b immediately above is then repeated until the termination signal is reached.

(d) The end of the text equivalent is delimited by a carriage return followed by a line feed.

The text equivalent for the block of text in step II-A12 is: * 1 s 16 b 12 n 4 d 42

(II-A14) The computer transforms the text equivalent based on the text equivalent of the previous block of text in a story. If there is no prior block, this step is skipped.

If there is a previous block, the computer consults the list of matching carryover symbols generated in step II-A16 below. The computer adds any matching carryover symbols followed by the diagnostic distance of zero to the end of the current text equivalent.

This step permits the implied meaning in a previous block of text to be transferred to the current block.

(II-A15) After any additions to the text equivalent in step II-A14, the the computer makes transformations on the resulting text equivalent following the text equivalent transformation rules of step II-A3. Each rule is comprised of the following elements:

(a) a "specified operator symbol" which can be any one of the concept symbols in the text analysis dictionary, (b) a "specified target symbol" which can also be any one of the concept symbols in the text analysis dictionary or the reserved symbol "$,"

(c) a "specified direction" indicated by one of the three letters A, B, E" (A for ahead, B for behind, and E for either), (d) a "specified distance" indicated by an integer, (e) a "specified decision symbol" which can be one of the concept symbols in the text analysis dictionary or the reserved symbol "%," and (f) a Boolean "specified operator retention" variable.

The computer applies individual rules in their order of entry into memory as follows:

(a) The computer scans the text equivalent until a diagnostic symbol matches the specified operator symbol. This matching diagnostic symbol is marked as the "matching operator symbol."

(b) If a matching operator symbol is found, the computer marks diagnostic symbols in the text equivalent as "matching target symbols" based on the specified target symbol, distance and direction as follows:

(i) If the specified target symbol is "$," the computer marks the matching operator symbol as a matching target symbol.

(ii) If the specified target symbol is not "$," the specified distance and specified direction are used as follows:

(1) If the specified distance is zero, than the computer compares the matching operator entry with the specified target symbol. If a match is found, the computer marks the matching operator symbol as a matching target symbol.

(2) If the specified distance is less than zero and the specified direction is "A," then the computer marks, as matching target symbol, all diagnostic symbols matching the specified target symbol if these symbols are ahead of the matching operator symbol in the text equivalent.

(3) If the specified distance is less than zero and the specified direction is "B," then the computer marks, as matching target symbol, all diagnostic symbols matching the specified target symbol if these symbols are behind the matching operator symbol in the text equivalent.

(4) If the specified distance is less than zero and the specified direction is "E," then the computer marks, as matching target symbols, all diagnostic symbols in the text equivalent matching the specified target symbol.

(5) If the specified distance is greater than zero and the specified direction is "A," then the computer marks, as the matching target symbol, the diagnostic symbol immediately ahead of the matching operator symbol in the text equivalent if the following symbol matches the specified target symbol and if the intervening diagnostic distance is less than the specified distance.

(6) If the specified distance is greater than zero and the specified direction is "B," then the computer marks, as the matching target symbol, the diagnostic symbol immediately behind the matching operator symbol in the text equivalent if the preceding symbol matches the specified target symbol and if the intervening diagnostic distance is less than the specified distance.

(7) If the specified distance is greater than zero and the specified direction is "E," then the computer marks, as the matching target symbol, the diagnostic symbol just ahead of the matching operator symbol in the text equivalent if the following symbol matches the specified target symbol and if the intervening diagnostic distance is less than the specified distance. If this following symbol is not marked, then the computer marks the diagnostic symbol in the text equivalent just behind the matching operator symbol as the matching target symbol if the prior symbol matches the specified target symbol and if the intervening diagnostic distance is less than the specified distance.

(c) Transformations are performed on the text equivalent based on matching target symbols as follows:

(i) If the matching target symbol is "$," then:

(1) If the specified direction is "B," the computer inserts the specified decision symbol and then the specified distance into the text equivalent just prior to the matching target symbol.

(2) If the specified direction is "A," the computer inserts the specified distance and then the specified decision symbol into the text equivalent just after to the matching target symbol.

(ii) If the matching target symbol is not "$," then:

(1) If the specified decision symbol is "%," then the specified target symbol and its following diagnostic distance are both deleted from the text equivalent, (2) If the specified decision symbol is not "%," then the matching target symbol is replaced by the specified decision symbol.

(iii) If the specified operator retention variable is FALSE, then the matching operator symbol and its following diagnostic distance are both deleted from the text equivalent.

These transformations are now illustrated using the text equivalent of step II-A13 and three sample text equivalent transformation rules.

(a) Rule 1:  Specified operator symbol = n
            Specified target symbol = d
            Specified direction = A
            Specified distance = 10
            Specified decision symbol = %
            Specified operator retention variable = FALSE This rule has the function of removing, from the text equivalent, references to non-defense matters. Application of this rule to the text equivalent of step II-A13, repeated here, * 1 s 16 b 12 n 4 d 42 yields * 1 s 16 b 12. In applying rule 1, the computer marks the "n" in the text equivalent as the matching operator symbol. Since the specified direction is "A," the computer examines the diagnostic symbol after the "n" and finds a match with the specified target symbol of "A." The intervening diagnostic distance of 4 is also less than the specified distance of 10. Since these two criteria are both met, the computer marks the diagnostic symbol "d" as the matching target symbol. Since the decision symbol is "%," the matching target symbol and its following diagnostic distance of 42 are both deleted. Then, because the specified operator retention variable is FALSE, the computer also deletes the matching operator symbol "n" and its following diagnostic distance of 4.

(b) Rule 2:  Specified operator symbol = b
            Specified target symbol = s
            Specified direction = B
            Specified distance = −1
            Specified decision symbol = +
            Specified operator retention variable = TRUE Application of this rule to the previously transformed text equivalent * 1 s 16 b 12 yields * 1 + 16 b 12. In this transformation, the computer finds and marks the matching operator symbol "b" in the text equivalent. Since the specified direction is "B" with the meaning of either ahead or behind and since the specified distance is less than zero, the computer searches for all occurrences of the target symbol anywhere in the text equivalent. The computer finds the matching target symbol "s." Since this was not the reserved symbol "%," the computer replaces the matching target symbol "s" with the specified decision symbol "+." Since the specified operator retention variable is TRUE, the matching operator symbol is retained in the text equivalent. In this way, it has been possible to combine the meanings of "American defense" represented by the "b" and "spending" represented by the "s" to give the meaning of "American defense spending" represented by the "+."

(c) Rule 3:  Specified operator symbol = +
            Specified target symbol = S
            Specified direction = B
            Specified distance = 0
            Specified decision symbol = A
            Specified operator retention variable = TRUE Application of this rule to the previously transformed text equivalent * 1 + 16 b 12 yields * 1 A 0 + 16 b 12. In this transformation, the computer finds the matching operator symbol "+." Since the target symbol is the reserved symbol "$" and since the specified direction is "B," the computer marks the matching operator symbol as the matching target symbol and inserts the specified decision symbol "A" and the specified diagnostic distance of 0 just before the target entry.

Rule 3 has permitted the extraction of individual meanings from concept symbols embodying several different concepts. In the example presented above, the concept of "America" denoted by the concept symbol "A" could be written explicitly in the text equivalent since "America" was already a part of the concept of "American defense spending" denoted by the concept symbol "+." In the dictionary of Table 2, the word "Marine" alone was interpreted to embody the meaning of "American defense." Therefore, the concept of "America" was always implied through not explicitly stated as a separate word.

Even through Marine can refer to other concepts besides a subset of the American military. It is possible to let Marine have this connotation, if the set of collected AP dispatches almost always uses this word in this context. Therefore, ambiguous words can have a precise meaning if text containing other meanings is eliminated.

As a general rule, the text transformation rules leads to a series of transformations resulting in a final text equivalent containing concept symbols representing directly the concepts used for the decisions for a block of text.

(II-A16) After performing all the transformations specified by the text equivalent transformation rules, the computer makes a list of matching carryover symbols comprising of all concept symbols which are in both the list of specified carryover symbols (entered at step II-A3) and in the final text equivalent.

As an example, consider symbol "A" being in the list of carryover symbols. In this case, the computer would enter this symbol in the list of matching carryover symbols if the text equivalent is the final one in the previous step, namely, * 1 A 0+16 b 12.

The use of "A" as a specified carryover symbol permits the connotation of "American" to be transferred from one block of text to the next. This designation is desirable when it is not certain that the next block of text would refer to "America" unless the previous block of text had this implication.

(II-A17) The computer checks the text equivalent for any diagnostic symbols which match the list of retention symbols. If any are found, the computer sets the Boolean block retention variable as TRUE. Otherwise the block retention variable is set as FALSE. The computer then checks the text equivalent for any diagnostic symbols matching the list of discard symbols. If any matches are found, the block retention flag is set as FALSE.

The computer writes the block of text, including the <> marks and their included concept symbols to the full text output file on disk. Immediately following this text, the computer writes the text equivalent both before any transformations have been made and also after each transformation step. If the block retention flag is TRUE, the computer then writes the words "PREVIOUS TEXT IS RETAINED." If the block retention flag is FALSE, the computer writes "PREVIOUS TEXT IS DISCARDED" instead.

In addition, if the block retention flag is TRUE, the computer also writes to the filtered text output file the same items described above for the full text output file with the omission of the text equivalents after the transformations. Also, the phrases about the previous text being retained or discarded are also not written since only retained text is stored in the filtered text output file.

Continuing with the text of step I-3, it is possible to filter for the retention of only those paragraphs directly relevant to American defense spending. In this case, the "+" symbol could be used as the retention signal. It would be unnecessary to specify any concept symbols as discard symbols. In this case, the "+" in last text equivalent of step II-A15 would case the block retention variable to be set to TRUE. The output to the full text output file for the block of text in step II-A15 would be:

]"<s>Funding for the <b>Marines and <n>non-<d>defense items should not be cut," he said.
* 1 s 16 b 12 n 4 d 42
* 1 s 16 b 12
* 1+16 b 12
* 1 A 0+16 b 12
PREVIOUS TEXT IS RETAINED (II-A18) The computer repeats steps II-A7 to II-A17 above after finding the next initiation signal in the text and moving the current begin block of text marker to this initiation signal. The repetition stops when the end of the story is reached.

The second block of text from the edited text of step I-3 would be:

!He did ask for a reduction in health care <s>spending. with text equivalent:
* 42 s 9

The text equivalent transformation of step II-A14 would yield
* 42 s 9 A 0
after addition of the matching carryover symbol of "A" (identified in step II-A16) and the diagnostic distance of 0.

There is no change in this text equivalent following any of the Rules 1 to 3 of step II-A15. Since there is no "+" symbol in the final transformed text equivalent, the computer sets the block retention variable to FALSE and writes the block of text, the original text equivalent, the three text equivalents after application of the transformation rules, and the words "PREVIOUS TEXT IS DISCARDED" to the full text output file.

Nothing from this second block or text is written to the filtered text output file. The result is a more homogeneous text containing only those paragraphs directly relevant to "American defense spending."

After steps II-A1 through this step, the filtered story of step I-3 is:
* 87.0027
!"<s>Funding for the <b>Marines and <n>non-<d>defense items should not be cut," he said.
* 1 s 16 b 12 n 4 d 42

(II-A19) The text filtration steps II-A5 to II-A18 for individual stories are repeated for all retrieved stories.

(II-A20) If the text after step II-A18 retains important amounts of irrelevant text, the computer loads a new dictionary and set of corresponding rules based on criteria different from those for steps II-A1 to II-A4 and repeats the text filtration steps II-A5 to II-A18. If necessary, this filtration to remove irrelevant text is repeated using a new alternative dictionary and corresponding set of rules each time until reasonably homogeneous text is obtained.

The text used for these further filtrations is the filtered text output file of an earlier filtration. In loading the text in step II-A5, the computer removes all old diagnostic symbols by eliminating all character strings beginning with "<" and ending with ">". The computer also removes the old text equivalent by removing the string of characters between the "*" symbol marking the beginning of a text equivalent and the carriage return marking the end of a text equivalent as shown in step II-A17.

II-B. Text Scoring

The stores are each scored for the extent to which they support positions relevant to public opinion change for the tissue under study.

Continuing with the example from step II-A20 above, the task proceeds using a text analysis dictionary, a set of transformation rules and a set of scoring rules all designed for the computation of numerical "message scores" favoring the three positions of More, Same and Less defense spending.

Every message is given an index number k. For this kth message, the scores are designated $s_{ij''k}$ where index i refers to the source of the information as deduced from the message itself, where index $j''$ denotes the position the score favors, and where k is the message index. Index i is odd if the scored information directly supports a position so that the message is accessible to all members of the population. Index i is even if the information directly supports the position so that only those already of the issue are able to make the connection. For example if the President of the United States is quoted in the kth message as saying that there should be More defense spending, then:

(a) i=an odd number (e.g. i=3) identifying the source as the President (the number is odd for defense spending because the message directly advocates a position on this issue; indirect Presidential assertions requiring interpretation by the audience would have another i characteristic of the President but the index, e.g. i=4, would be an even number), (b) j''=1 if the position of More defense spending had this index, and (c) k=the index number identifying the AP story from which the quote came.

This definition for $s_{ij''k}$ is the same as that in equation A.28 of Appendix A of Fan (1987). Because index i can have several values, reflecting different message sources, it is possible for a message to have several scores with different indices i favoring the same position indexed by j''.

In the simplest scoring for the defense spending example, no distinctions would be made between messages according to source. In this degenerate case of no source dependence, i=1 for all sources, both direct and indirect. This is assumption made for the defense spending scoring described below.

The actual scoring involves determining $s_{ij''k}$ values for each block of text and then summing the values for all blocks of text. Therefore, the additional term $s_{ij''kq}$ is introduced where q is the index for individual blocks of text. Thus $s_{ij''kq}$ is the score for the ith source, supporting the j''th position, of the qth block of text within the kth story. The final $s_{ij''k}$ for a story is the sum of the $s_{ij''kq}$ over all the q for that story.

The text scoring procedure itself is very similar to that for the text filtrations and is performed on text remaining after all the filtration steps described in step II-A.

(II-B1) The text scoring uses a text analysis dictionary and a set of text transformation rules with exactly the same formats as those in steps II-A. In addition, the task requires a set of "text scoring rules."

(II-B2) The computer reads and stores in memory the text analysis dictionary, the text transformation rules, and the text scoring rules.

Since the text scoring rules include concept symbols from the text analysis dictionary, it is necessary to discuss the dictionary before considering the text scoring rules. Therefore, consider the example of the text from step II-A20. For this example, the dictionary could include the fragments of the concept and dictionary arrays shown in Table 3 (the complete dictionary would have more entries):

TABLE 3

Concept and dictionary arrays of text analysis dictionary

Fragment of concept array

| Concept mnemonic | Concept symbol |
|---|---|
| AheadNegation | / |
| LessWord | L |
| SameWord | S |
| MoreWord | M |

Fragment of dictionary array

| Dictionary word | Concept symbol |
|---|---|
| not | / |

TABLE 3-continued

Concept and dictionary arrays of text analysis dictionary

Fragment of concept array

| Concept mnemonic | Concept symbol |
|---|---|
| cut | L |

In this dictionary, the words with the concept of AheadNegation would cause a reversal in the sense of words further into the text equivalent. A typical example would be the word "not."]LessWord would be a word favoring less spending. The example in the dictionary is the word "cut." Since the text filtration illustrated in step II-A above had already required that the paragraph be about "American defense spending," the text scoring step might simply be based on word clusters implying support for More, Same or Less without regard to reference to America, defense or spending. In this case, the concepts of "less," "same," and "more" (LessWord, SameWord, MoreWord in the dictionary of Table 3) would be enough for the text scoring rules.

These rules are a two dimensional array with elements $S_{ij''}$ where i indexes the sources of thoughts in the collected AP stories and j'' indexes the positions favored by the message scores. Each element $S_{ij''}$ has two components:

(a) a "scoring mnemonic" comprised of a strings of characters, sufficiently long to suggest the source of a thought and the position that thought is scored to support, and (b) a corresponding "scoring symbol" comprised of a concept symbol. The appearance of a scoring symbol in the qth text equivalent of the kth story would lead to a positive numerical score $s_{ij''kq}$.

Consider the task where all messages are scored independently of source so that i=1 for all scores. Furthermore, consider that MoreWord in Table 3 implies support of More defense spending and corresponds to index j''=1. Similarly, SameWord might imply support for Same spending with index j''=2, and LessWord might imply support for Less spending with index j''=3. Then, the scoring rules would have the form of Table 4.

TABLE 4

Text scoring rules

The prefix letter "s" is frequently used to indicate a scoring mnemonic so that sMore, sSame, and sLess correspond to scores supporting More, Same and Less defense spending. The scoring symbols are from Table 3.

| $S_{ij''k}$ | Scoring mnemonic | Scoring symbol |
|---|---|---|
| $S_{11}$ | sMore | M |
| $S_{12}$ | sSame | S |
| $S_{13}$ | sLess | L |

(II-B3) The computer loads the filtered texts of the collected stories after the last filtration of step II-A20. As for the filtration of step II-A20, the computer removes from the text all strings beginning with "<" and ending with ">" and omits the text equivalents. The computer then performs steps II-A5 to II-A16 using the text analysis dictionary and the text transformation rules of step II-B2.

If the initiation and termination signals for blocks of text are paragraphs as in step II-A3, and if the dictionary is that in Table 4, then the computer would construct this text and text equivalent from the text of step II-A20:

!"Funding for the Marines and non-defense items should </>not be <L>cut," he said.

* 54/8 L 14

Since the decision in the example of step II-B2 was simply to score word combinations favoring More, Same and Less, the following text equivalent transformation rule could be used with "not less" being considered to be equivalent to "same:"

| Rule 4: | Specified operator symbol = / |
|---|---|
| | Specified target symbol = L |
| | Specified direction = A |
| | Specified distance = 20 |
| | Specified decision symbol = S |
| | Specified operator retention variable = FALSE |

Computer applicaion of this rule to the previous text equivalent * 54/8 L 14 yields * 54 S 14.

(II-B4) After constructing the summary text equivalents by performing the text equivalent transformations for the qth block of text of the kth message using the text transformation rules of step II-B4 above, the computer then uses the text scoring rules to calculate the $s_{ij''kq}$ values in the following manner.

The computer compares the scoring symbols in the $S_{ij''}$ of the text scoring rules with the concept symbols in the summary text equivalent of the qth block of text of the kth message. The computer calculates the $S_{ij''kq}$ for a particular i and j'' by dividing the number of matches for the concept symbols in the corresponding $S_{ij''}$ by the total number of all matches for all concept symbols in all the $S_{ij''}$ regardless of i and j''. By performing this division, the same total score is given for every AP paragraph. If matches are found for two concept symbols supporting different positions, the total paragraph score would be divided among the corresponding concepts.

Using the text scoring rules of Table 4 for the transformed text equivalent of step II-B3, the computer obtains:

$s_{11kl} = 0 / 1 = 0.0$ AP paragraphs,
$s_{12kl} = 1 / 1 = 1.0$ AP paragraphs, and
$s_{13kl} = 0 / 1 = 0.0$ AP paragraphs.

Here, the corresponding block of text is the first in the story so q=1. The units for $S_{ij''kq}$ are the types of blocks of text scored. Since the scores above are for a typical AP paragraph, the units are AP paragraphs. For calculating these $s_{ij''kq}$ scores, scoring symbol "S" in Table 4 appears once while scoring symbols "L" and "M" appear zero times in the text equivalent. With only one appearance of a scoring symbol, the total number of matches is 1+0+0=1.

To permit the system operator to follow the progress of the analysis, the computer writes to the monitor a full text output file in a format very much like the full text output file of step II-A17. The only difference is that a line describing the block scores replaces the sentences announcing the retention or discarding of previous text. The block of text scores in the output (beginning with the word "SCORES:") includes the scoring mnemonic in the $S_{ij''}$ with the same i and j'' as in the $s_{ij''kq}$ (see Table 4):

!"Funding for the Marines and non-defense items should </>not be <L>cut," he said.

* 54/8 L 14

* 54 S 14

SCORES: sMore=0.0, sSame=1.0, sLess=0.0

(II-B5) The computer repeats steps II-B3 and II-B4, for all blocks of text q in the kth story. Upon scoring the last block of text, computer sums the individual $s_{ij''kq}$ over all q to obtain the final $s_{ij''k}$ score. For the kth story, the computer writes the decimal date, denoted $t_k$, and these final scores $s_{ij''k}$ to disk.

Since there was only one block of text left in the example of step II-A20, the final message scores $s_{ij''k}$ are the same as the $s_{ij''kl}$ scores in step II-B4 above.

(II-B6) The computer repeats steps II-B3 to II-B5 for the remaining text of all the stories after the filtration of step II-A20 and writes their $s_{ij''k}$ and their corresponding $t_k$ to disk.

The examples presented above were chosen to illustrate the major options in the text analysis dictionary, in the transformation rules, in the text filtration, and in the text scoring rules. The actual dictionaries, transformation rules, text filtration rules, and text scoring rules used for the analysis of American defense spending (Fan, 1987) were somewhat different. Fan (1987) also describes the application of the text analysis in this step II to five other topics. In all cases, the text analysis was found to give acceptable results (see Chapter 3 and Appendix C of Fan, 1987).

III. Computations of public opinion.

(III-1) The computer reads from disk all the data calculated in step II-B6 and stores these data as a "scores array" with index k so that each array element contains the $t_k$ and all the corresponding $s_{ij''k}$ of the kth story. The computer then sorts the elements of the scores array by date with the data from earliest story being the first item in the array and the information from the latest message being the last. In all subsequent steps, index k refers to the array index after sorting.

For example, if the story retrieved in step I-3 and scored in step II-B6 had index k, then its entry in the scores array would be:

$t_k = 87.0027$.
$s_{11k} = 0.0$ AP paragraphs,
$s_{12k} = 1.0$ AP paragraphs, and
$s_{13k} = 0.0$ AP paragraphs.

(III-2) In order to compare predicted and measured public opinion, the system operator enters into the computer via the keyboard a series results from measured public opinion polls. This series will typically include data from published opinion polls in which the same question or close variants are asked at a number of different times. Since people are only allowed to hold one position for any single polled issue, opinion polls assume that the total population can be divided into subpopulations, $P_j$, each with members favoring the same polled position with index j. The fraction of the total population in subpopulation $P_j$ is defined as $B_j$. The percentage in the No Opinion or Don't Know category can be considered to be a separate subpopulation or the percentage for this group can be removed with the remaining percentages for defined positions being renormalized to 100%. This nomenclature follows that in Section A.2 and A.4 of Fan (1987).

Since public opinion can change, $B_j$ will vary with time t so that $B_j = B_j(t)$. To indicate that opinion percentages are from poll data, the $B_j(t)$ from polls carry the extra subscript P and therefore have the form $B_{Pj}(t)$.

Different polls in a series are identified by index numbers n so the nth poll result favoring position j is $B_{Pnj}(t)$. If $t_{Pn}$ is the time at which the nth poll was taken, with subscript P again indicating that time is for a poll, then $B_{Pnj}(t) = B_{pnj}(t_{Pn})$. The time $t_{Pn}$ of a poll is computed by averaging the beginning and ending date of the poll.

A series of poll data appropriate for the example in Step I, is given in Table B.1 of Fan (1987). For the calculations in Fan (1987), the percentage of Not sures and Don't knows were subtracted with the remaining 90% or so of the population favoring More, Same and Less defense spending being renormalized to 100%.

(III-3) Similar to the case with the message scores, the computer stores the poll data as an array indexed by poll number n with each "opinion array" element having the $t_{Pn}$ of the poll and the corresponding $B_{Pnj}(t_{Pn})$.

The computer sorts the array elements according to date $t_{Pn}$ with the poll at the earliest date being the first element in the array. In subsequent discussions, n will be the poll index after sorting.

For example, the first element of the poll array for the first line of the data of Table B.1 of Fan (1987) (after removal of the Not sure's and renormalization as mentioned above) would have n=1. The corresponding element in the poll array consists of:

$t_{P1} = (31 + 28 + 15)/365 = 77.2027$ (The date before conversion to a decimal date was March, 1977. When only the month is supplied in the published poll, the poll date is assigned to the middle of the month, hence March 15, in the present example. The 31 and 28 are the number of days in January and February respectively.), $B_{P11} = 25.7\%$,
$B_{P12} = 49.5\%$, and
$B_{P13} = 24.9\%$.

(III-4) To predict public opinion, the computer loads a set of "refining weight" constants $w_{ijj''}$ prescribing the method for generating "persuasive force functions" $G''_{j'}$ describing the ability of information favoring a position to change the minds of persons holding different opinions. Equation A.29 of Fan (1987) relating these items to each other is reproduced below $$G''_{j'}(t) = \sum_{i,j'',k} w_{ijj''} \cdot s_{ij''k} \cdot e^{-p(t-t_k)}. \quad (A.29)$$

where the summation is over all i and j'' and over all k with $t_k < t$. These indices are the ones entered for $s_{ij''k}$ and $t_k$ in step III-1 above. Constant p is the "persistance constant" characteristic of AP stories. Constants $w_{ijj''}$ describe the contribution of each of the scores $s_{ij''k}$ to persuasive force function $G''_{j'}(t)$. Each persuasive force function $G''_{j'}(t)$ favors a position denoted by j'. These positions often coincide with the positions j'' of scores $s_{ij''k}$ but need not do so as discussed in Appendix A of Fan (1987).

These $w_{ijj''}$ permit different types of information favoring a position to have different weights. For instance, it is conceivable that information from the President of the United States might be more or less persuasive than messages from Congress for the issue of whether more should be spent for military defense. To take this possibility into account, scores $S_{3j''k}$ with index i=3 could refer to the quoted source being the President, and scores $s_{5j''k}$ with i=5 could refer to the quoted source being from Congress. Both indices would be odd if the scores were due to direct quotes favoring the position indexed by j''. Indices i=4,6 could be used if descriptions of Presidential and Congressional action indirectly supported a position on defense spending. A score attributed to the President ($s_{3jk}$) and one identified with Congress ($s_{5jk}$) could both favor the same position such as more defense spending (j''=1), and both scores could come from the same kth story. These scores would be differentiated by their indices i. If Presidential statements had greater persuasive force, then $w_{3jj''}$ would be greater than $w_{5jj''}$.

In the simplest case, the persuasive forces would favor the same positions as the scores contributing to these forces. Then, $w_{ijj''}$ would only have a positive, non-zero value when j''=j'. However, the $w_{ijj''}$ can also reflect ambiguities in the message scoring. For example, it is conceivable that the average message scored as favoring Same defense spending actually has a portion favoring More spending as well. In this case, the $s_{ij''k}$ favoring Same defense spending could contribute both to $G''_1(t)$ for More defense spending and to $G''_2(t)$ for Same defense spending with different weights $w_{ijj''}$ for the two contributions. If a position score $s_{ij''k}$ makes no contribution to persuasive force function $G''_{j'}(t)$, the corresponding refining weight $w_{ijj''}$ is zero.

The scores of step III-1 were for three positions j''=1,2,3 corresponding to support of More, Same or Less defense spending with no attribution by source so that i=1 for all scores. It is also reasonable to postulate that the $G''_{j'}$ functions causing opinion change for the issue of defense spending only received contributions from scores favoring these same three positions. In this case, the refining weights could be given by Table 5 where each $s_{ij''k}$ only contributed to the persuasive force function $G''_{j'}$ favoring the same position indexed by j''.

TABLE 5

Defining weights
In this Table, the non-zero $w_{ijj''}$ are indicated by their appropriate index numbers.

| Index j' for persuasive force $G''_{j'}(t)$ favoring | Index i for source = 1 Index j'' for scores $s_{ij''k}$ favoring | | |
|---|---|---|---|
| | More (j''=1) | Same (j''=2) | Less (j''=3) |
| More (j'=1) | $w_{111}$ | 0.0 | 0.0 |
| Same (j'=2) | 0.0 | $w_{122}$ | 0.0 |
| Less (j'=3) | 0.0 | 0.0 | $w_{133}$ |

All values $w_{111}$, $w_{122}$, and $w_{133}$ would further have the same value if all scores $s_{ij''k}$ were equally persuasive. Both the simple model of Table 5 and equality in the $w_{ij''k}$ values functioned well for the defense spending analysis of Fan (1987, Chapter 4).

(III-5) For opinion predictions, the computer also loads a set of "population conversion rules." These rules are summarized as an array of constants $k'_{2j'rj}$. These constants are used in equation A.26 of Fan (1987). This equation is reproduced here:

$$B_j(t) = B_j(t - \Delta t) + (T/R) \cdot \Delta t \cdot \left( \sum_{j',r} G''_{j'}(t) \cdot [k'_{2j'rj} \cdot B_r(t - \Delta t) - k'_{2jjr} \cdot B_j(t - \Delta t)] \right). \quad (A.26)$$

The $G''_j(t)$ terms are from equation A.29 (see above), R=the number of random messages collected in step I, T=the total number of messages identified as relevant in step I, $\Delta t$=the time interval used by the computer for iterative opinion calculations, $B_j(t)$=the percentages of the population in subpopulations $P_j$ as discussed in step III-2, and "modified persuasibility constants" $k'_{2j'rj}$ (from Table 5) describe the ability of persuasive forces $G_{j'}$ to move persons from a "target subpopulation" $P_r$ to a "destination subpopulation" $P_j$.

The number of people persuaded to change their opinions from that of $P_r$ to that of $P_j$ is proportional to the size $B_r$ of the target subpopulation and the magnitude of the persuasive force $G''_{j'}$. The constant of proportionality is the modified persuasibility constant $k'_{2j'rj}$. If a $G''_{j'}$ cannot cause any conversion of people in $P_r$ to join $P_j$, then $k'_{2j'rj}=0$. For example, information favoring Less defense spending should not persuade those favoring Less spending to support More spending. The computer assumes that all $k'_{2j'rj}$ have the same constant value denoted by $k'_2$ whenever a transition can be caused.

In FIG. 4.2 of Fan (1987) it is assumed that the population conversions for defense spending are as follows:

$G''_1$ converts members from $P_3$ favoring Les to $P_2$ favoring Same, $G''_1$ converts members from $P_2$ favoring Same to $P_1$ favoring More, $G''_2$ converts members from $P_3$ favoring Less to $P_2$ favoring Same, $G''_2$ converts members from $P_1$ favoring More to $P_2$ favoring Same, $G''_3$ converts members from $P_{11}$ favoring More to $P_2$ favoring Same, $G''_3$ converts members from $P_2$ favoring Same to $P_3$ favoring Same.

These conversions would lead to the population conversion rules of Table 6:

TABLE 6

Population conversion rules

All non-zero $k'_{2j'rj}$ are entered with their appropriate indices and have the constant value of $k'_2$. In this Table:
the position of More corresponds to $j = 1$, $j' = 1$, and $r = 1$;
the position of Same corresponds to $j = 2$, $j' = 2$, and $r = 2$; and
the position of Less corresponds to $j = 3$, $j' = 3$, and $r = 3$.

| Index j' for persuasive force $G''_{j'}$ | Index r for target subpopulation $P_r$ | Index j for destination subpopulation $P_j$ | | |
|---|---|---|---|---|
| | | j = 1 | j = 2 | j = 3 |
| j' = 1 | r = 1 | 0.0 | 0.0 | 0.0 |
| | r = 2 | $k'_{2121}$ | 0.0 | 0.0 |
| | r = 3 | 0.0 | $k'_{2132}$ | 0.0 |
| j' = 2 | r = 1 | 0.0 | $k'_{2212}$ | 0.0 |
| | r = 2 | 0.0 | 0.0 | 0.0 |
| | r = 3 | 0.0 | $k'_{2232}$ | 0.0 |
| j' = 3 | r = 1 | 0.0 | $k'_{2312}$ | 0.0 |
| | r = 2 | 0.0 | 0.0 | $k'_{2323}$ |
| | r = 3 | 0.0 | 0.0 | 0.0 |

(III-6) Using the loaded rules, the computer performs calculations of public opinion as a time trend using equations A.29 and A.26 as follows:

(a) The computer chooses as t, the time of the first poll $t_{p1}$.

(b) The computer calculates, for time $t = t_{P1} + \Delta t$, all values of $G''_{j'}(t)$ using equation A.29, the $s_{ij''k}$ and $t_k$ loaded in step III-1 from step II, constant p and constants $w_{ij'j''}$ assigned in step III-'.

(c) The computer uses the poll percentages, $B_{P1j}$ at $t_{P1}$ as the first $B_j(t-\Delta t)$ in equation A.26. (The $B_r(t-\Delta t)$ values are the same.)

(d) The computer calculates $B_j(t)$ at $t = (t_{P1} + \Delta t)$ from these $B_j(t-\Delta t)$, the R and T values calculated in the initial story retrieval step I-2, the $G''_{j'}(t)$ calculated in step b immediately above, a specified t, and the $k'_{2j'rj}$ terms assigned in step III-5.

(e) The computer repeats the calculations of step b above after advancing time t by t to obtain values of $G''_{j'}(t)$ one t later. The computer repeats step d using as $B_j(t-\Delta t)$ the $B_j(t)$ calculated in the previous step d.

(f) The computer repeats step e, advancing time t in increments of $\Delta t$, until the t is greater than the $t_{Pn}$ of the last poll time with index n. The result is a set of values for $B_j$ at times $\Delta t$ apart. The computer writes all these results to disk, and displays the opinion time trend as a graph on the monitor and on the printer.

An example of these data plotted as time trends is shown in FIG. 4.6 Fan (1987). The measured $B_{Pj}(t)$ values from the published polls described in step III-3 above are also plotted as squares for comparison.

The computer also writes the calculated values of $G''_j(t)$ to disk. The $G''_j(t)$ functions used for the computation of FIG. 4.6 of Fan (1987) are plotted as the time trends of FIG. 4.4 of Fan (1987).

(g) During the calculations of step f, the computer calculates and sums a series of "squared deviations" between the calculated opinion and the published opinion values. These squared deviations are calculated whenever the time $t_{Pn}$ of a published opinion poll coincides with one of the times t in the calculations of step h or is between two of these times t.

If time $t_{Pn}$ coincides with one of the times of step f, then the computer calculates, as the squared deviation, the square of the difference between the calculated opinion $B_j(t_{Pn})$ and the poll value favoring the same position $B_{Pnj}(t_{Pn})$. A separate squared deviation is calculated for each position j and all squared deviations are summed.

If time $t_{Pn}$ is between two calculation times $t-\Delta t$ and t, and if $\Delta t$ is 24 hours or less, then the computer calculates the squared deviations between the poll value $B_{Pnj}$ and both $B_j(t-\Delta t)$ and $B_j(t)$. The smaller of the two squared deviations is used for the summation. This decision is based on the argument that there are at least 24 hour uncertainties in the times of the polls and in the times of the AP messages so it is not unreasonable to choose the lesser of the deviations for estimating the calculation errors.

If the $\Delta t$ is longer than 24 hours, then the computer calculates the $B_j(t_{Pn})$ corresponding to the measured $B_{Pnj}$ by performing a linear interpolation between the $B_j(t-\Delta t)$ and $B_j(t)$ to obtain the $B_j(t_{Pn})$.

After calculations at all of the times of step g, the computer will have calculated square deviations for all poll points. The computer then computes a mean squared deviation by dividing the sum of the squared deviations by the total number of deviations computed. The computer writes the mean squared deviation to the display device and the printer.

(III-7) Optionally, the computer computes the mean squared deviation for a number of trial values of constant p, the $k'_{2j'rj}$, and the $w_{ij'j''}$. The computer chooses as optimal those constants those giving the minimum mean squared deviation.

Alternative embodiments

Although a specific example of the preferred embodiment is given above, a number of modifications of this embodiment are possible within the scope of this invention:

I. Alternative messages and scoring.

Broadly speaking, the determinations in the preferred embodiment occur in three defined steps: collecting messages, scoring the messages, and using the message scores to determine time trends of public opinion. Since these steps are largely independent, it is possible to vary both the messages and their scoring.

The essential feature of the messages is that they must be representative of those available to the population and relevant to the issue for which opinion is computed. As discussed in Chapter 1 of Fan (1987), the messages can be from any source ranging from personal experiences to those in the mass media. Any of these messages can be used in the computations of this patent so long as three critical features can be assigned:

(a) numerical scores for the extent to which different attributed sources in the message support different positions of the issue, (b) a time dependent function describing the availability of the message to the population, and (c) a numerical validity score for the reputation of the medium transmitting the message.

Therefore, the following alternative methods can be used:

I-A. Alternative messages.

In addition to AP stories in the preferred embodiment, messages can be collected from any source relevant to the issue for which opinion calculations are made. These can include other mass media messages both in the written press and in the electronic press. The messages can be in any form ranging from personal experiences, through words and pictures on written pages to broadcasts via television and radio.

Besides actual messages which the computer can retrieve and score (see following section), it is also possible to postulate specified numerical scores for items a and c in this alternative embodiment. Then a mathematical function can be postulated for item b. With these specifications, it is possible to include in opinion calculations messages which cannot be measured easily but which can be modeled mathematically.

I-B. Message scoring.

Every message must be scored for the extent to which it supports different positions within the issue being analyzed. These scores $s_{ij'k}$ in equation A.29 of the preferred embodiment were obtained by the computer assisted content analysis of step II of the preferred embodiment.

This same procedure can be performed for any message comprised of text which can be transferred to characters readable by computer. If the text is only found as written words on paper, it is possible for the system operator to read and enter the text into the computer by use of the keyboard. Alternatively, it is possible to use an electronic device to read the text and convert it into computer readable form.

I-C. Message availability to the population.

For AP stores in the preferred embodiment, it was assumed that information in an AP dispatch would have its maximum persuasive force on the date of the story. After that time, the effectiveness was postulated to decrease exponentially with time with a characteristic persistance constant. This time course is described in the $e^{-p(t-t_k)}$ term of equation A.29. This same time course can also be used for other mass media messages from newspapers, television and radio.

However, other mathematical functions may be more appropriate for other message sources. For example, information from a book may have a time course which increases over a substantial time period before finally decreasing.

In principle, it is possible to postulate any arbitrary time dependent mathematical function to describe the availability of a message to the population. Such a function would replace the $e^{-p(t-t_k)}$ in equation A.29. It is also possible to measure this availability directly. For a book, for instance, it is possible to approximate the availability by the measured pattern of sales over time. Since the $e^{-p(t-t_k)}$ term is specific for each message with index k, this term could be replaced by a different measured or postulated function for each message.

The discussion so far has only been for the time course of the message availability. More completely, the availability of the message also includes a scaling factor describing the number of people reached at a particular time—for instance when the message's persuasive force was the greatest. The larger the audience at this time, the greater will be the total effect of the message.

If only AP messages are used, then this scaling factor will be constant for all messages so the factor was absorbed into constant $k'_2$ of equation A.26 (see Appendix A of Fan, 1987). This procedure means that different $k'_2$ should be used for messages from different media. Therefore, if messages from more than one medium are used, messages from different media will need different $k'_2$.

I-D. Validity of the medium.

Like the scaling factor for message availability just discussed, the reputation of the medium is also absorbed into constant $k'_2$ (see Appendix A of Fan, 1987) for the analysis of AP stories. Again, if other types of messages are used, this $k'_2$ should differ according to the medium.

II. Replacements for G'' functions.

In Appendix A, it is proposed that the G'' functions in equation A.26 can be replaced by equation A.13 reproduced below:

$$H_{jr}(t) = G_j(t)/(d_{jr} \cdot G_r(t) + d_{jj} \cdot G_j(t) + 1) \qquad (A.13)$$

where $d_{jr}$ and $d_{jj}$ are both constants. In the preferred embodiment, these constants were assumed to be sufficiently small that their product with the G functions in equation A.13 are much less than 1. Functions G'' and G are related to each other by a constant factor as discussed in Appendix A of Fan (1987).

To use this equation in opinion calculations, equation A.26 is replaced by equation A.15 of Fan (1987) reproduced below:

$$dB_j(t)/dt = \sum_{j',r} [k_{2j'rj} \cdot H_{j'r}(t) \cdot B_r(t) - k_{2jjr} \cdot H_{jr}(t) \cdot B_j(t)]. \qquad (A.15)$$

This equation can be solved at intervals of $\Delta t$ essentially as described in step III of the preferred embodiment once the $H_{j'r(t)}$ are calculated. All other terms in the equation have already been described in that step III.

III. Inclusion of unawareness

So far in this patent, the assumption has been made that all people were aware of the issue being analyzed. When a significant fraction of the population is unaware, it is possible to use equations A.34–A.36 of Fan (1987) to determine expected public opinion (see Appendix A of Fan, 1987 for justifications). These equations are reproduced below.

$$A(t) = A(t - \Delta t) + \left( \left[ (T/R) \cdot \sum_{j,j'} k'_{1j'j} \cdot F_{j'}(t) \cdot (1 - A(t)) \right] - u \cdot A(t) \right) \cdot \Delta t. \quad (A.34)$$

for all j and j' where u is constant and $$F_{j'}(t) = \sum_{i,j'',k} w_{ij'j''} \cdot s_{ij''k} \cdot e^{-p(t-t_k)} \quad (A.35)$$

for all odd i, all j", and all k where $t < t_k$. Finally, $$A(t) \cdot B_j(t) = A(t) \cdot B_j(t - \Delta t) + (T/R) \cdot \Delta t \cdot \left( \sum_{j',r} G''_{j'}(t) \cdot [k'_{2j'rj} \cdot A(t) \cdot B_r(t - \Delta t) - k'_{2jjr} \cdot A(t) \cdot B_j(t - \Delta t)] \right) + (T/R) \cdot$$

$$t \cdot \left[ \sum_{j'} k'_{1j'j} \cdot F_{j'}(t) \cdot (1 - A(t)) \right] - u \cdot A(t) \cdot B_j(t). \quad (A.36)$$

for all j' and r.

The computer calculates functions $F'_{j'}(t)$ using equation A.35, and the same scores $s_{ij''k}$, $w_{ij'j''}$ values and constant p as appear in equation A.29. However, the summation this time is only over odd i instead of all i. the computer then reads values for constats u and the $k'_{1j'j}$ as well an initial value, typically from measured opinion polls, for the fraction (1-A(t−t)) of the population at (t−t) who are unaware. Employing these data, the computer can calculate A(t) at increasing intervals of t using the A(t) of one calculation as the A(t−t) of the next calculation (see analogous strategy for calculations $B_j(t)$ as described in step III-9 of the preferred embodiment). The calculated values of A(t) and the data discussed above can then be inserted into equation A.36 to compute the fraction $A(t) \cdot B_j(t)$ of the population holding the opinion with the corresponding index j.

IV. Alternate concept and diagnostic symbols.

In the preferred embodiment, the concept and diagnostic symbols all comprised of a single character. Alternatively, it is possible to use concept and diagnostic symbols containing any combination of data bits. For example, strings of characters can be used. It is only necessary that reserved codes (not necessarily the "<" and ">" of the preferred embodiment) be used to mark the beginnings and ends of concept symbols. With these control codes, the computer can identify the beginnings and ends of the concept and diagnostic symbols. With this identification, the computer can remove concept symbols and text equivalents from a previous text filtration step before any further text analysis steps.

In the text of the output files from the preferred embodiment, the control codes for the beginnings and ends of the concept symbols were "<" and ">". In the text equivalents, on the other hand, the control codes marking the beginnings and ends of the concept symbols were spaces. This difference illustrates that it is unnecessary that the control codes be the same in the text and in the text equivalents in the output files.

V. Parsing of text by words instead of characters.

In the preferred embodiment, words were defined as any arbitrary string of characters. With this definition, comparisons between words in the text and words in the dictionary were performed by permitting a word to start at any character in the text. Also, any leading and trailing letters were permitted. Alternatively, it is possible to require that the words begin and/or end with defined control codes such as spaces, carriage returns, etc. In this case, the dictionary searches could be for words beginning or ending with a control character. The dictionary could also have reserved control characters at the beginnings, in the middles, and/or at the ends of word entries to indicate that replacement characters are possible for the control characters.

VI. Opinion determinations without reference to poll measurements.

Opinion determinatons in the preferred embodiment began with the first $B_j(t-\Delta t)$ being taken from the results of a public opinion poll. However, it is also possible to take advantage of the results of FIG. 4.10 of Fan (1987). This figure shows that the opinion calculations will converge to a consensus value as time proceeds regardless of the first $B_j(t-\Delta t)$. Therefore, it is possible to perform two opinion calculations beginning with widely disparate values for an opinion $B_j(t-\Delta t)$ e.g. 0% and 100 %. Opinion in the time period during which the two calculations converged could then be taken as a reasonable estimate of expected opinion.

VII. Alternative determinations of scores for blocks of text.

In step II-B4 of the preferred embodiment, the block of text scores $s_{ij''kq}$ for a particular i and j" were obtained after division of the sum of all $s_{ij''kq}$. Alternaive divisors with appropriate weights could be used based on some combination of $s_{ij''kq}$ scores. As yet another alternative, there might only be the summing of the counts of concept symbols with no subsequent division step.

VIII. Alternate use of the specified distance.

When the specified distance is greater than zero in step II-A15 of the preferred embodiment, a matching target symbol can only marked if it is separated from the matching operator symbol by no more than one diagnostic distance number. Alternatively, the separation can involve more than one diagnostic distance if the total of all intervening diagnostic distances between the matching operator and target symbols is less than the specified distance. The same specified direction rules would still be used as in the preferred embodiment.

IX. Alternations in the contents and text equivalents of blocks of text.

In step II-A15 of the preferred embodiment, the essential concepts of a block of text are summarized as a final transformed text equivalent. The concepts from one block of text can be transferred to the text equivalent of the following block of text by the use of carryover symbols which are added to the following text equivalents (see steps II-A14 and II-A16). This is done when the contents of one block of text implied the presence of certain concepts in other blocks of text from the same story.

This procedure can be generalized in two ways. The first generalization is to alter not just the text equivalent of the following block of text but also text equivalents of other specified blocks of text. The modification can involve not only the addition but also the deletion or replacement of elements in these other text equivalents.

The other generalization is the alteration of the text of other blocks of text. For example, the sample text equivalent of step II-A16, carried the connotation of "American." Besides using carryover symbols to insert the concept symbol for "American" into the text equivalent of the next block of text, it is possible to insert the word "American" into the text of another specified block of text.

Words would be inserted in, altered in or deleted from the text of a block of text when it is desirable that the words should continue to appear in all subsequent filtration or scoring steps for a block of text. Conversely, if it is preferable that the connotation should disappear in subsequent manipulations, it would be more appropriate to change text equivalents since text equivalents are always erased before any following text analysis steps.

X. Hardware based system.

In this alternative embodiment, the microprocessor 10 and software (FIG. 1) is replaced by an alternative hardwired logic system.

Figure 2:
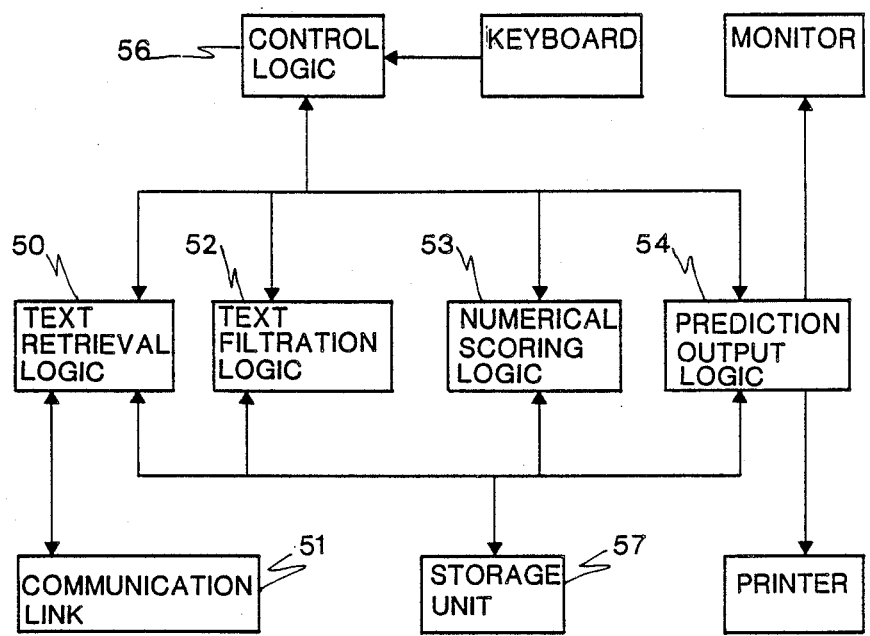
FIG. 2 is a simplified block diagram of an alternative hardware logic embodiment of the invention.
Figure 3:
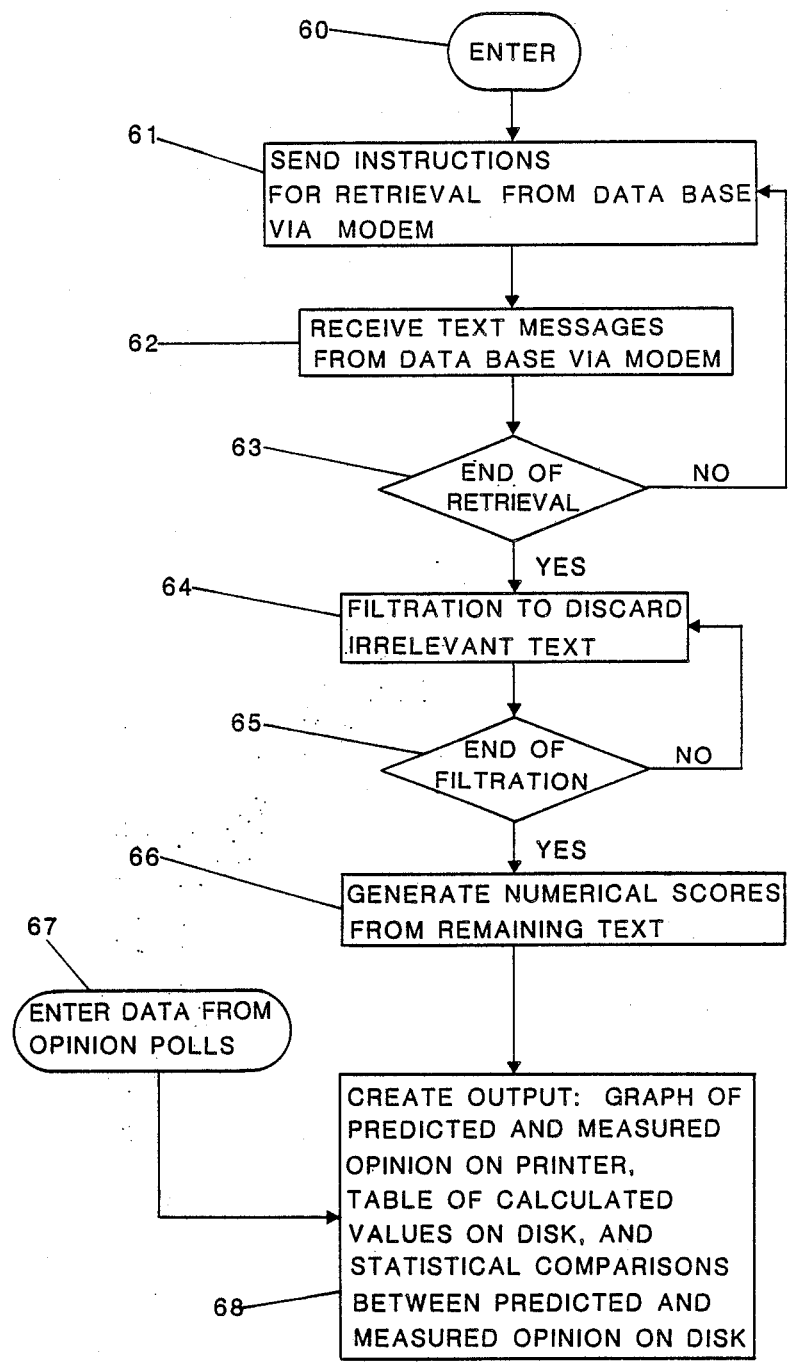
FIG. 3 is a logical flow diagram showing the functional operation of the alternative embodiment.

Referring now to FIGS. 2 and 3, a block diagram and flow diagram, respectively, of the opinion prediction operation of this hardware system is shown. The system includes text retrieval logic 50, text filtration logic 52, numerical scoring logic 53, prediction and output logic 54, and control logic 56. Output logic 54 is connected to drive a monitor and a printer, while control logic 56 includes a keyboard input. Text retrieval logic 50 is connected to a communication link 51 from which data may be acquired, for example, from a data bank. Digital storage unit 57, either random access memory or magnetic medium based, is connected to all logic modules 50, 52, 53 and 54.

Control logic 56 includes hardwired logic for controlling the other logic modules to perform the functions outlined in the flow diagram of FIG. 3. Referring to FIG. 3, the start of operation of the system is represented by block 60. In block 61, logic 56 causes retrieval logic 50 to command an external data base via a communication link 51 to retrieve text and to store it in storage unit 57, in the same manner as described above with respect to step I of the software embodiment. In block 62, retrieval logic 50 receives the text of retrieved messages from the data base via the link 51 and stores the text in storage unit 57. If a signal indicates that more text is to be retrieved in block 63, the retrieval logic 50 repeats blocks 61 and 62. When no more text is to be retrieved, the logic 50 will have finished the equivalent of step I of the preferred embodiment.

At this pont, control logic 56 causes filtration logic 52 to activate the first dictionary and its corresponding set of text filtration rules (block 64), which are predetermined and stored in storage unit 57. Logic 52 uses this dictionary and set of rules to remove tex irrelevant to the prediction in the same manner as described above with respect to step II of the software embodiment. At the end of this text filtration, the filtered text is stored in storage unit 57 and logic 52 checks for the presence of a subsequent dictionary and its corresponding set of text filtration rules (block 65). If another pair is found, logic 52 repeats the filtration process using the paired dictionary and set of rules. After no more filtration dictionaries and rules are found, the logic 52 signals control logic 56 to activate the scoring logic 53. Logic 53 operates pursuant to present text scoring dictionary and rules stored in unit 57 (block 66) and assigns numerical scores for the remaining text, in the same manner as described above with respect to step II of the software embodiment. After calculation of the scores, the scores are stored in storage unit 57.

Before or during the operation of the system, the operator has the option of entering the results of data from measured public opinion polls into storage unit 57 via the keyboard and logic 56 (block 67). In block 68, control logic 56 activates prediction logic 54 which uses specified parameters, refining weights $w_{ij'}$ and population conversion rules $k'_{2j'rj}$ stored in unit 57 to compute time trends of public opinion in the same manner as described above with respect to step III of the software embodiment. The results are plotted as time trends on the printer 12 with reference to FIG. 1. For comparison, the processor also plots the results of time trends from measured opinion polls. Logic 54 may optionally also compute statistical comparisons based on the differences between predicted and measured opinion values, if such values are available.

XI. Predictions for habits.

For the purpose of clarity and to aid in the understanding of the invention, all embodiments presented above have focused on the ability of information to change public opinion. However, opinion is only one example of a social trait. As indicated above, this invention also encompasses other social traits including habits like smoking.

The mathematical model in equations 1-7 of the Background of the Invention section above has already been extended to cover habits in "Ideodynamic predictions for the evolution of habits" by David P. Fan in *Journal of Mathematical Sociology*, Vol. 11, pp. 265-281, 1985. However, since that model also used equations 1-7, that theory extension was also inoperable.

Therefore, an alternative embodiment could involve addingsome of the concepts in that former extension to the embodiments described above to yield a functional system for predicting the fraction of the population with certain habits.

By their very nature, habits are activites performed at frequent intervals. Therefore, members of the population can be assigned to various positions based on the frequency with which they repeat the activities. In the smoking example, both smoking and non-smoking would be defined as habits. If desired, it is also possible to divide the smokers according to the frequency with which they smoke. Each position as defined in the preferred embodiment would have both a corresponding habit and a corresponding opinion. However, the fraction of the population with a habit need not match the fraction of the population holding the opinion that the habit should be adopted. For example, there may be many smokers who would like to quit.

In this embodiment for habits, opinion and habits are predicted independently of each other. Nevertheless, the two predictions share the same three steps of: (I) gathering messages relevant to the habit, (II) scoring the messages numerically for their ability to influence specified target subpopulations, and (III) analyzing the ability of the messages, as represented by their scores, to change the habits of appropriate target populations.

XI-A. Messages in the mass media.

All messages relevant to opinion change for a habit are also be assumed to be pertinent to change in practice of that habit. Thus anti-smoking messages would be assumed to able to influence both opinion on the desirability of smoking and the chances that that people will stop. These messages would be those described in the preferred embodiment and would lead to functions $G''_j$ of equation A.29.

XI-B. Mathematical functions replacing measured messages.

Some messages are difficult to measure directly. Since the ultimate impact of messages is described by persuasive force functions $G''_j$ in the preferred embodiment, messages which cannot be measured can nevertheless be included in the analysis if they can be modeled by postulated mathematical $G''_j$ functions. For habits, the paper by Fan cited earlier in this section includes two functions describing a "recidivism" effect and a "social pressure" effect. The recidivism effect in turn incorporates functions describing the "nostalgia" and "euphoria" phenomena. These functions are described in detail below:

XI-B1. Recidivism functions.

A person who has recently changed a habit has a "nostalgia" for the old habit and hence a better chance of reverting to an old habit than someone who had never had the former habit. Again, in the smoking example, a smoker who has quit will be more likely to start than someone who has never smoked. The system of this invention can account for this phenomenon by assigning mathematical "nostalgia" functions corresponding to personal experience infons favoring the start of smoking. These functions would have high values shortly after a change of habit with the values diminishing as time proceeds.

Similarly, the system of this invention can also include "euphoria" functions describing the honeymoon feeling just after a change of habit in which a person is very happy to have successfully made the habit change. As with the nostalgia function, the euphoria function will also decrease with time.

The euphoria and nostalgia functions were merged into equations 16 describing the combined "net recidivism" effect in the paper by Fan in the Journal of Mathematical Sociology mentioned earlier in this section. The combined effects yielded a recidivism persuasive force function $G_{jR}(t',t)$ with the form:

$$G_{jR}(t',t) = k_R \cdot e^{-k_N(t-t')} \cdot (1 - e^{-k_U(t-t')}). \quad (16)$$

This function uses the term G since it has the same purpose as the G functions of step III of the preferred embodiment, namely the persuasion of susceptible members of the population to undergo social change. In this function, subscript j indicates the position toward which the function is likely to draw recruits and subscript R refers to the function describing the recidivism effect. The function is measured at time t and depends on an earlier time t' at which members of the subpopulation left the habit characterized by subscript j. If $G_{jR}(t',t)$ is the function describing the recidivism to smoking, then t' would be the time before the measurement time t when the smoker had quit. Parameters $k_R$, $k_N$, and $k_U$ are constants. In habit computations, this function $G_{jR}$ is added to the $G''_j$ functions of equation A.29 and entered in place of the $G''_j$ in equation A.26.

XI-B2. Social pressure functions.

Besides the recidivism infon impact functions, it may also be convenient to postulate other functions G reflecting informational forces for social change. For example, in the Fan paper discussed earlier in this section, it was postulated that there are social pressure messages which can be modeled by assuming that messages in favor of smoking or non-smoking occur in proportion to the number of people observed in these categories. This phenomenon is described by equation 9 of the paper by Fan discussed earlier in this section:

$$G_{jS}(t) = k_S \cdot D_j(t) \quad (9)$$

where function $G_{jS}$ carries subscript S denoting that it is a social pressure infon impact function. Subscript j refers to the position the function favors, $k_S$ is a constant and $D_j$ is the fraction of the population practicing the habit corresponding to the position indexed by j.

XI-C. Habit trend determinations.

The basic system of this invention can be used to compute the fraction of the population with a habit by a method essentially the same as that described in step III of the preferred embodiment.

However, not all people would would like to change a habit may actually do so. Therefore, the $k'_{2j'rj}$ terms in Table 6 describing the ability of a message to cause a social change would be smaller for behavior change than for opinion change.

In the calculations, recidivism persuasive force functions, tailored for each subpopulation, are added to the the social pressure persuasive forces and the G functions from measured messages as described above for opinion change. Since the recidivism persuasive force functions depend on the time of a prior habit change, the population needs to be divided into many small subpopulations depending on the time of the previous habit change. The computations of step III of the preferred embodiment are made for the various subpopulations and the results for the subpopulations are then summed to get the overall time trends.

XII. Predictions for other social traits.

For previous alternative embodiment extends the predictive methods of the system from opinions to habits. In principle, the methods can be extended further to any measurable social trait for which people can be grouped into subpopulations according to a specified set of positions. Such traits could include the purchase and use of products.

In all cases, the same methods would be used: The relevant population would be divided into appropriate subpopulations according to the traits being measured and according to the sensitivities of the subpopulation members to various incoming messages. The members of a subpopulation would all have the same trait such as not having purchased a product. The system would then calculate numerical scores for the ability of various messages to convince people to make a measurable change such as purchasing the product. The scores would then be used to compute expected social change as a function of time. The result would be a time trend for the social trait.

Thus it will be seen that this invention has a very broad scope given its ability to predict social changes in all areas ranging from opinions through habits to the purchase of products by consumers.

One important aspect of this invention is the use of computers to determine the effectiveness of messages favoring different positions. This computer based technology permits on impartial and unbiased assessment of the different components of messages supporting different ideas. Therefore, besides merely being used in the context of social change, the text analysis portion of this invention permits the user to determine, for any purpose, the extent to which different ideas are favored. For example, personnel management is of crucial importance in the industrial sector. In order to hire and evaluate personnel, it is often necessary to examine the texts of letters of reference and the contents of text in personnel files. The text analysis portion of this invention will permit the employer to glean from such textual information as to whether an employee or prospective employee has important qualifications or deficiencies in areas of particular importance to given jobs. To be more specific, some jobs may require great accuracy and patience while initiative and creativity might be more critical for others. The text analysis of this invention will permit the employer to scan and evaluate written reports about the employee for comment on these traits.

The ability to predict the effect of information on social traits will also be useful for industrial campaigns to persuade the work force to adopt desirable habits. An immediate example would be efforts to educate workers about appropriate safety measures and to persuade them that the measures should be taken seriously.

The coupling of text analysis with predictions of social traits permits an examination of the amount and quantity of information needed to cause a social change. Once of the unique features of this invention is its ability to include opposing information in analyzing the effects of favorable information. Thus, it is possible to evaluate the effects of advertising and public relations. A decrease in market share for a commercial product or favorable opinion for a position could be traced to a competitor mounting an even more effective campaign than that of the original advertiser or public relations expert. The conclusion could be that nothing was done wrong but only that more needs to be done.

Althugh the invention has been described here in its preferred form, it shall be understood that changes may be made in detail in structure without departing from the spirit and scope of the invention as set forth in the claims appended hereto.

In the claims:

1. A system for processing information to determine expected opinion in a specified population for a specified issue with two or more specified positions, said system comprising:
   a digital computer;
   software means operable in said computer for causing said computer to:
   (a) maintain, for said issue, text comprised of a representative set of text messages used by members of said specified population over time for formulating opinions on said specified issue wherein said text messages are single packets of text information each able to support one or more of a plurality of said positions and transmitted in identical copies to the members of said specified population;
   (b) search and operate on said text to determine the relationships in said text between one or more specified words within each text message;
   (c) determine numerical scores for each said text message reflecting the extent said message favors each of said two or more specified positions on said issue, one of said numerical scores determined independently for the extent to which said message supports each of said specified positions based on said relationships of one or more specified words so that the value of each said numerical score is independent of the value of other scores determined for said message; and
   (d) determine expected time trends of percentages of the population that favor said two or more positions on said issued based on determining changes in said percentages wherein said numerical scores are used to determine how said text messages will affect the opinions of members of said specified population to cause members to change from favoring one position to another.

2. The system according to claim 1 further including software means operable on said computer to cause said computer to reduce the text of each of said messages by removal of text irrelevant to said issues before determining said numerical scores.

3. The system according to claim 1 wherein said software means further includes means for causing said computer to:
   (a) divide the text of each of said messages into specified blocks of text;
   (b) make summary representations of said specified blocks of text wherein each important concept conveyed by said specified block of text is reduced to a single concept symbol, and wherein each said important concept is identified from:
      (1) one or more specified words within said specified block of text,
      (2) a quantity of text between said one or more specified words within said specified block of text, and
      (3) the sequence within said specified block of text of said one or more specified words;
   (c) determine, based on said summary representations
      (1) which representative blocks of text to use to determine said numerical scores for each said message, and
      (2) numerical scores for each said message.

4. A system for processing information to determine expected public opinion in a specified population for a specified issue with two or more specified positions, said system comprising:
   a digital computer;
   communication means for electronically collecting text into said computer, said text organized in messages including text message components used by members of said population over time to formulate opinions on said specified issue wherein said text message components are single packets of information transmitted in identical copies to said specified population;
   software means operable on said computer for causing said computer to:
   (a) collect, for said issue, a representative set of text message components each organized in text blocks and used by members of said population over time for formulating opinions on said specified issue, said text message components collected through said communication means;
   (b) determine numerical scores representing the extent each said text message favors each of said two or more specified positions on said issue through causing said computer to determine said numerical scores based on the text by:
      (1) dividing the text of each said message into specified blocks of text;

(2) making summary representations of individual blocks of text wherein each important concept conveyed by said specified block of text is reduced to a single concept symbol, and wherein each said concept is identified from:
   (a) one or more specified words within said specified block of text,
   (b) a quantity of text between said specified words within said specified block of text, and
   (c) the sequence within said specified block of text of said specified words; and
(3) determine, based on said summary representations:
   (a) which representative blocks of text to use to determine said numerical scores for each said message, and
   (b) numerical scores for each said message;
   (c) determine expected time trends of percentages of said specified population that favor each of said two or more positions on said issue based on determining changes in percentages wherein said numerical scores are used to determine how said text message components will affect the opinions of members of said specified population to cause said members to change from favoring one position to another.

5. The system according to claim 3 or 4 wherein said software means for causing said computer to make summary representations of said specified blocks of text further includes means for causing said computer to:
   (a) maintain a dictionary containing a limited number of words likely to be contained in the text of said specified blocks of text;
   (b) maintain a set of concept symbols corresponding to the concepts to be used in evaluating presence of said two or more specified positions on said issued within said specified blocks of text;
   (c) assign each word in said dictionary to one of said concept symbols;
   (d) scan the text of said specified block of text using pattern matching for the occurrence of matching words wherein matching words are those also found in said dictionary;
   (e) maintain a set of transformation rules for identifying said important concepts within said text wherein an important concept is identified from:
      (1) one or more specified words within said specified block of text,
      (2) a quantity of text between said one or more specified words within said specified block of text, and
      (3) the sequence within said text of said one or more specified words; and
   (f) transform said summary representations to obtain a reduced summary representations wherein said important concepts conveyed by said text, relevant to said issue, are each reduced to a single concept symbol.

6. The system according to claim 5 wherein each said reduced summary representation is in the form of a text equivalent listing comprising: '(a) a symbol representing a beginning of said specified block of text wherein said symbol has the same form as that of said concept symbols;
   (b) a distance symbol representing a quantity of text between the beginning of said specified block of text and its next nearest neighbor wherein said next nearest neighbor is a said matching word, or the end of said block of text;
   (c) the concept symbol corresponding to each said matching word in said specified block of text;
   (d) a distance symbol corresponding to said distance between each said matching word and its next nearest neighbor or said end of said specified block of text; and
   (e) sequence information specifying the sequence of said beginning, each said matching word, and said end of said specified block of text.

7. The system according to claim 5 wherein said means to cause said computer to transform said summary representations to obtain said reduced summary representations further includes means to cause said computer to:
   (a) perform evaluations of pairs of said concept symbols in said text equivalent of said specified block of text wherein said evaluations are based on said symbols, said sequence information, and said distance symbols in said text equivalent listing; and
   (b) perform transformations on said text equivalent listing to reduce said text equivalent listing to important concept symbols wherein said transformations are based on said evaluations of pairs of said concept symbols.

8. The system according to claim 7 wherein said transformations further include based on relationships defined in said transformation rules:
   (a) inserting a specified distance symbol and a specified concept symbol into said specified text equivalent; and
   (b) modifying said sequence information of said specified text equivalent.

9. The system according to claim 7 wherein said transformations further include based on relationships defined in said transformation rules:
   (a) deleting a specified concept symbol and a specified distance symbol from a specified text equivalent; and
   (b) modifying said sequence information of said text equivalent.

10. The system according to claim 7 wherein said transformations further include replacing a specified distance symbol in a specified text equivalent according to relationships defined in said transformation rules.

11. The system according to claim 7 wherein said transformations further include replacing a specified concept symbol in a specified text equivalent according to relationships defined in said transformation rules.

12. The system according to claim 3 or 4 wherein said software means for causing said computer to determine said numerical scores for each said message further includes means for causing said computer to sum the occurrences of said concept symbols in said summary representations of said specified blocks of text of said message wherein each said occurrence contributes a specified quantity to said numerical scores.

13. The system according to claim 3 or 4 wherein said software means for making said summary representations from said specified blocks of text further includes means for causing said computer to:
   (a) alter said summary representations based on said specified blocks of text and specified input rules, wherein said input rules specify one or more concept symbols to insert and the method for insertion into said summary representations, and (b) alter individual and specified blocks of text, based on other blocks of text and specified input rules, wherein said input rules specify one or more words to insert and locations within said individual text blocks for their insertion.

14. The system according to claim 13 wherein said alterations further include insertion of one or more specified words into the text of said message at locations specified by said input rules and based on said summary representation, wherein said one or more specified words are quantities of text defined in said input rules.

15. The system according to claim 13 wherein said alterations further include the deletions of above specified words from the text of said message at locations specified by said input rules and based on said summary representation, wherein said specified words are quantities of text defined in said input rules.

16. The system according to claim 13 wherein said alterations further include the replacement of one or more specified words in the text of said message by one or more specified replacement words at locations specified by input rules, based on said summary representation, wherein said one or more specified words and said one or more replacement words are quantities of text defined in said input rules.

17. The system according to claim 1 or 4 wherein said means for causing said computer to determine said expected time trends further includes means to cause said computer to:
(a) formulate specifications for using said numerical scores and estimates of the sizes of subpopulations of said population holding different opinions at specified times to calculate changes in said sizes at other times;
(b) perform calculations of expected values of said subpopulation sizes using said numerical scores and said specifications to obtain opinion time trends within said population.

18. The system according to claim 17 wherein:
(a) said specifications include means for using said numerical scores to construct mathematical functions describing the extent to which said messages can cause changes in said subpopulation sizes; and wherein
(b) said specifications further include said construction of mathematical functions based on said estimates of subpopulation sizes.

19. The system according to claim 18 wherein said functions include weighting terms to compensate for the increased or decreased power of additional said numerical scores to cause changes in said subpopulation sizes as specified said numerical scores increase.

20. The system according to claim 19 wherein said weighting terms compensate by accounting for:
(a) reinforcement of opinions already held; and
(b) the diminished impact of frequently repeated information.

21. The system according to claim 18 wherein said mathematical functions permit numerical scores corresponding to different classes of information within messages to have different weights.

22. The system according to claim 18 wherein said mathematical functions depend upon:
(a) sources deduced from message components with said scores wherein said sources of said message components can include the author of said message components, or referenced authors or speakers, or are unavailable;
(b) audience sizes of said message components wherein the audience sizes reflect the approximate number of individuals to which the said message components are distributed;
(c) reputations of the media carrying said message components wherein the reputations of media reflect the reliability and trustworthiness of the media transporting said message component to said audience;
(d) degrees of directness of said message components wherein the degrees of directness reflect the explicitness with which said message components relate to the issue;
(e) contents of said message components wherein said contents reflects the extent said message components support specified positions on said issue.

23. The system according to claim 18 wherein said functions reflect an exponential loss in the extent a message component is diminished in its capacity to cause said changes in said subpopulation sizes as time proceeds.

24. The system according to claim 18 wherein said functions permit different numerical scores corresponding to different components within the same message having different weights.

25. The system according to claim 18 wherein said calculations of expected opinion of members of said specified population are product of said functions describing the subpopulation sizes and said functions based on numerical scores.

26. The system according to claim 17 wherein said specification includes a list of possible population conversions wherein each entry in the list further comprises:
(a) a specified mathematical function describing the extent specified said numerical scores can cause changes in said subpopulation sizes;
(b) a specified subpopulation of said specified population whose size can be decreased by said mathematical function; and
(c) a specified subpopulation of said specified population whose size can be increased by said mathematical function.

27. The system according to claim 17 wherein said calculations are performed by:
(a) beginning with specified sizes of said subpopulations at a specified initial time; and
(b) proceeding by calculating sizes of said subpopulations at subsequent times in a series of iterative steps wherein the said subpopulation sizes at specified times are used to calculate said subpopulation sizes at specified later times.

28. The system according to claim 17 wherein the computer optimizes said specifications by minimizing the differences in the squares of deviations between calculated subpopulation sizes and specified subpopulation sizes.

29. The system according to claim 17 wherein said specifications are that increased numerical scores corresponding to one of said specified two or more positions leads to greater changes in specified subpopulation sizes.

30. The system according to claim 17 wherein said specifications are that changes in individual said subpopulation sizes increase with the sizes of specified said subpopulations.

31. The system according to claim 17 wherein said specifications are that the size of said subpopulation unaware of said issue increases in proportion to the size of said subpopulation aware of said issue.

32. The system according to claim 17 wherein said computer optimizes said specifications by achieving specified small differences over a specified time interval between sizes of said subpopulations for two or more calculations beginning with widely disparate initial sizes for said subpopulations.

33. A system for reducing a text message organized in blocks of text to its essential message components favoring one or more specified positions on a specified issue and assigning numerical scores to said message representing the extent to which said message favors one or more of said specified positions wherein the text of said message is represented in digital form and includes message components in human language, said system comprising:

a computer, said computer including a digital storage medium holding the text of said message and software means operable on said computer to cause said computer to reduce the text of said message by removal of text irrelevant to said one or more of said specified positions before determining said numerical scores, wherein the remaining text is homogeneous, and the remaining words are used with limited meanings and limited ambiguity; and wherein said software means further includes means for causing said computer to:
(a) divide the text of said message into said blocks of text;
(b) make summary representations of individual blocks of text wherein each important concept conveyed by said text is reduced to a single concept symbol, and wherein each said important concept is identified from:
(1) one or more specified words within said individual block of text,
(2) a quantity of text between said specified words within said individual block of text, and
(3) the sequence within said individual block of text of said specified words;
(c) determine, based on said summary representations:
(1) which representative block of text to use to determine the numerical scores for said message, and
(2) numerical scores for said message.

34. The system according to claim 33 wherein said software means for causing said computer to make summary representations further includes means for causing said computer to:
(a) maintain a dictionary containing a limited number of words likely to be contained in the text of said blocks of text;
(b) maintain a set of concept symbols corresponding to concepts to be used in evaluating presence of said positions on said issue within said blocks of text;
(c) assign each word in said dictionary to one of said concept symbols;
(d) scan the text of said representative block of text using pattern matching for the occurrence of matching words wherein matching words are those also found in said dictionary;
(e) maintain a set of transformation rules for identifying important concepts within said text wherein an important concept is determined by:
(a) one or more specified words within said text block,
(b) a quantity of text between said specified words within said text block, and
(c) the sequence within said text of said specified words; and
(f) transform said representations to obtain a summary representations wherein the important concepts of said text, relevant to said issue, are each reduced to a single concept symbol.

35. The system according to claim 34 wherein each said reduced summary representation is in the form of a text equivalent listing comprising:
(a) a symbol representing the beginning of said specified block of text wherein said symbol has the same form as that of said concept symbols;
(b) a distance symbol representing a quantity of text between the beginning of said specified block of text and its nearest neighbor wherein said nearest neighbor is a said matching word, or the end of said block of text;
(c) the concept symbol corresponding to each said matching word in said specified block of text;
(d) a distance symbol corresponding to said distance between each said matching word and its next nearest neighbor or said end of said specified block of text; and
(e) sequence information specifying the sequence of said beginning, each said matching word, and said end of specified block of text.

36. The system according to claim 34 wherein said means to cause said computer to transform said representations to obtain said reduced summary representations further includes means to cause said computer to:
(a) perform evaluations of said pairs of concept symbols in said text equivalent of said specified block of text wherein said evaluations are based on said symbols, said sequence information, and said distance symbols in said text equivalent listing; and
(b) perform transformations on said text equivalent listing to reduce said text equivalent listing to only important concept symbols wherein said transformations are based on said evaluations of pairs of said concept symbols.

37. The system according to claim 36 wherein said transformations further include based on relationships defined in said transformation rules:
inserting a specified distance symbol and a specified concept symbol into said specified text equivalent; and
(b) modifying said sequence representation of said specified text equivalent.

38. The system according to claim 36 wherein said transformation further include based on relationships defined in said transformation rules:
(a) delecting a specified concept symbol and a specified distance symbol from a specified text equivalent; and
(b) modifying said sequence information of said text equivalent.

39. The system according to claim 36 wherein said transformations further include replacing a specified distance symbol in a specified text equivalent according to relationships defined in said transformation rules.

40. The system according to claim 36 wherein said transformations further include replacing a specified concept symbol in a specified text equivalent according to relationships defined in said transformation rules.

41. The system according to claim 33 wherein said software means for making said summary representations from said specified blocks of text further includes means for causing said computer to:
  (a) alter said summary representations based on said specified blocks of text and specified input rules, wherein said input rules specify one or more concept symbols to insert and the method for their insertion within said summary representation, and
  (b) alter individual said specified blocks of text, based on other specified blocks of text and specified input rules, wherein said input rules specify one or more words to insert and locations within said individual text blocks for their insertion.

42. The system according to claim 41 wherein said alterations further include the insertion of one or more specified words into the text of said message at specified positions at locations specified by said input rules and based on said summary representation, wherein said one or more specified words are quantities of text defined in said input rules.

43. The system according to claim 41 wherein said alterations further include the deletions of one or more specified words from the text of said message at locations specified by said input rules and based on said summary representation, wherein said one or more specified words are quantities of text defined in said input rules.

44. The system according to claim 41 wherein said alterations further include the replacements of said one or more specified words in the text of said message by one or more specified replacement of words at locations specified by said input rules and based on said summary representation, wherein said one or more specified words are quantities of text defined in said input rules.

45. The system according to claim 41 wherein said alterations include the addition of specified concept symbols to said text equivalent of said block with or without control codes indicating the presence of said added concept symbols, based on said input rules and blocks of text.

46. The system according to claim 41 wherein said software means for causing said computer to determine said numerical scores for each said message further includes means for causing said computer to sum the occurrences of said concept symbols said summary representation of the blocks of text of said message wherein each said occurrence a contributes specified quantity to said numerical scores.

47. A system for reducing a text message to its essential message components and assigning numerical scores to said message representing the extent to which said message favors one or more predetermined ideas wherein the text of said message is stored in digital form in a storage medium and includes message components in a human language, said system comprising:
  a computer, said computer comprising:
  (a) means to maintain in said computer a dictionary of predetermined concept words and a dictionary of identifying words wherein each of said identifying words is a text representation of said concept words, and wherein said concept words represent a predetermined concept;
  (b) means to maintain in said computer a set of predetermined scoring rules wherein said scoring rules define relationships between one or more concept words;
  (c) means for searching said text stored in said medium for a first plurality of predetermined concept words and identifying words in said message which match with said predetermined concept words, such instance of a plurality being a set of matching words;
  (d) means for determining the sequence of matching words in said message and the distance between pairs matching words wherein distance is a numeric representation of the quantity of text between the said pair of matching words in said text;
  (e) means for analyzing said matching words, said sequence of matching words, and said distances between pairs of matching words to select blocks of text in said message according to one or more predetermined rules, wherein said predetermined rules define a relationship between one or more said matching words that identifies said blocks of text as relevant to a specified issue;
  (f) means for searching each said relevant block of text in said messages for a plurality of predetermined scoring words and identifying words in said block which match with said scoring words;
  (g) means for determining the sequence within said block of text of matching scoring words and the distance between each pair of matching scoring words;
  (h) means for assigning numerical scores for each relevant block of text according to one or more predetermined scoring rules, each of said rules specifying a relationship between one or more said matching scoring words and identifying which said positions the block of text favors; and
  (i) means for assigning a numerical score to said message according to the numerical score for the relevant blocks of text found therein.

48. A system for processing information to determine expected opinions of members of a specified population for a specified issue with two or more specified positions:
  a digital computer including communication means for electronically connecting said computer to an electronic database containing text stored in digital form, said text including message comprised of one or more message components used by said specified population over time for formulating opinions on said issues;
  said computer further including:
  (a) means for selectively searching said database to collect, for said issue, a representative set of messages used by said specified population over time for formulating said opinions on said positions;
  (b) means for searching and operating on the collected text to determine the relationships in the text between one or more specified words within each text message;
  (c) means to determine numerical scores for said messages indicating the extent said messages favor said two or more specified positions on said issue, one of said numerical scores determined independently for the extent to which said message supports each of said specified positions based on said relationships of one or more specified words so that the value of each said numerical score is independent of the value of other scores determined for said messages; and
  (d) means for determining expected time trends of percentage values of said opinions of members of said specified population based on opinion changes the influence of said messages on audience opinion as represented by said numerical scores.

49. A system for processing information to determine expected public opinion in a specified population for a specified issue with two or more specified positions, said populating including two or more subpopulations each favoring one of said two or more specified positions, comprising:

a digital computer including communications means for electronically connecting said computer to an electronic database containing text messages in digital form, said text including message components used by the public over time for formulating opinions on said issue; said computer further including:

(a) means for selectively searching said database according to predetermined criteria to collect, for said issue, a representative set of messages used by said population over time for formulating opinions on said two or more positions; and (b) means to maintain in said computer a dictionary of predetermined concept words and a dictionary of identifying words wherein each of said identifying words is a text representation of said concept words, and wherein said concept words represent a predetermined concept;

(c) means to maintain in said computer a set of predetermined scoring rules wherein said scoring rules define relationships between said one or more predetermined concept words;

(d) means for searching each said message for a first plurality of said predetermined concept words, and said identifying words in said message which match with said predetermined concept words;

(e) means for determining the sequence of said matching words in said message and the distance between each pair of matching words wherein said distance is a numerical representation of the quanity of text between said pairs of matching words within said block of text;

(f) means for analyzing said matching words and said distances between said pairs of matching words within said blocks of text to select relevant blocks of text in said message according to one or more predetermined rules, wherein each of said rules defines a relationship between said one or more matching words and identifies blocks of text within said message relevant to said issue;

(g) means for searching each said relevant blocks of text in said messages for a plurality of said predetermined scoring words and said identifying words in said block of text which match with said scoring words;

(h) means for determining the sequence with said message of said matching words in said relevant blocks of text and said distance between each pair of said matching words;

(i) means for assigning numerical scores to each said relevant block of text according to one or more predetermined scoring rules, wherein each of said predetermined scoring rules defines a relationship between said one or more of matching scoring words identifies which said one or more positions the block of text favors;

(j) means for assigning a numerical score to each of said messages according to said numerical scores for the relevant blocks of text found therein;

(k) means for sorting said message scores according to the appearance dates of the corresponding said messages;

(l) means for weighting said message scores according to one or more predetermined functions;

(m) means for determining changes in said subpopulation size over time from a specified subpopulation size at a starting time, and wherein said changes in subpopulation size are determined by determining the conversion of individuals from one subpopulation to another, said conversion determined according to one or more conversion functions defining the transfer of said members of said subpopulations from one subpopulation to another corresponding to the appearance dates and scores of said messages occurring subsequent to said starting time whereby changes in the opinions of said members of said population over time may be predicted based on the content of said representative set of messages.

50. A system for processing information to project expected public opinion in a specified population for a specified issue with two or more of specified positions, said population including two or more subpopulations each favoring one of said specified positions, said information comprising a set of messages in digital form, said set representative of messages used by said population over time for formulating opinions on said specified issue, said public opinion projected by determining shifts of individuals from one of said two or more subpopulating to another in response to the information content of said representative messages, the initial sizes of said two or more subpopulations being specified for an initial starting time, said system comprising:

a digital computer including storage means; said computer further including:

(a) means to maintain in said computer a dictionary of predetermined concept words and a dictionary of identifying words wherein each of said identifying words is a text representation of said predetermined concept words, and wherein said predetermined concept words represent a predetermined concept;

(b) means to maintain in said computer a set of predetermined scoring rules wherein said scoring rules define relationships between said one or more predetermined concept words;

(c) means for searching each said message for a first plurality of said predetermined concept words, and said identifying words in said message which match with said predetermined concept words wherein each word in said message which matches one of said identifying words is a matching word;

(d) means for analyzing each said matching word, and adjacent text in said message to identify relevant text message components according to one or more predetermined rules, each of said predetermined rules specifying a relationship between one or more of said matching words, and identifying blocks of text relevant to said issue in said messages;

(e) means for searching each relevant blocks of text in said messages for a plurality of said predetermined scoring words and said identifying words in said blocks of text which match with said scoring words;

(f) means for assigning numerical scores to each said relevant block of text according to one or more predetermined scoring rules, wherein each of said predetermined scoring rules defines a relationship between said one or more matching scoring words and identifies which said two or more positions the block of text favors, and wherein said blocks to text are assigned said numerical scores according to which said two or more positions they favor;

(g) means for assigning a numerical score to each of said messages according to said numerical scores for said relevant blocks of text found therein;

(h) means for storing said numerical message scores assigned to each of said messages according to the appearance time of the corresponding messages;

(i) means for determining changes in sizes of said two or more subpopulations over time from sizes of said two or more initial subpopulations, said changes in subpopulation size determined by determining the conversion of individuals from one subpopulation to another, said conversion determined according to one or more conversion functions defining the transfer of individuals from one subpopulation to another corresponding to the appearance dates and said numerical scores for said messages occurring subsequent to said starting time whereby changes in opinions of members of said population over time may be predicted based on the content of said representative set of messages.

51. A method for electronically processing information to project expected opinion of members in a specifed population for a specified issue with two or more specified positions, said population including two or more subpopulations each favoring one of said specified two or more positions, said information organized in messages in digital form, said set of messages representative of messages used by said specified population over time for formulating opinions on said two or more specified positions, said messages maintained in digital form in a digital storage medium, said opinion of members of said specified population projected by determining shifts of members from one of said two or more subpopulations to another in response to information content of said representative messages, the initial sizes being specified at a starting time, said method comprising the steps of:

(a) electronically maintaining in digital form a dictionary of predetermined concept words and a dictionary of identifying words wherein each of said identifying words is a text representation of said concept words, and wherein said concept words represent a predetermined concept;

(b) electronically maintaining in digital form a set of predetermined scoring rules wherein said scoring rules define relationships between said one or more predetermined concept words;

(c) electronically searching each said message for a first plurality of said predetermined concept words, and said identifying words in said message which match with said predetermined concept words;

(d) electronically scanning said matching words and adjacent text in said message to identify relevant blocks of text according to one or more predetermined rules, each of said predetermined rules defining a relationship between said one or more matching words and identifying blocks of text relevant to said specified issue in said messages;

(e) electronically searching each relevant block of text in said messages for a plurality of said predetermined scoring words and said identifying words in said message components which match with said scoring words;

(f) electronically assigning numerical scores for each said identified relevant block of text according to said predetermined scoring rules, wherein each of said rules specifies a relationship between said one or more matching scoring words and identifies which said two or more positions the block of text favors, said numerical scores entered in said storage medium;

(g) electronically assigning a numerical score to each of said messages according to said numerical scores for said relevant blocks of text found therein;

(h) electronically sorting said message scores in said storage medium according to the appearance dates of the corresponding messages;

(i) electronically determining changes in said two or more subpopulation sizes over time from said initial subpopulation sizes, said changes in subpopulation size determined by determining the conversion of individuals from one subpopulation to another, said conversion determined according to one or more conversion functions defining the transfer of individuals from one subpopulation to another corresponding to appearance dates and said numerical scores of said messages occurring subsequent to said starting time whereby changes in opinion of members of said population over time may be predicted based on the content of said representative set of messages.

52. A system for processing text information to determine expected opinion of members in a specified population for a specified issue with two or more specified positions, said population including two or more subpopulations each favoring one of said two or more specified positions, said system comprising:

a digital computer including a digital storage means and software means operable in said computer for determining numerical scores representing message components conveyed within said text information wherein each of said message components favors one corresponding position of said specified two or more positions wherein said numerical scores are derived from a representative set of said message components used by said population over time for formulating opinions on said two or more positions, said software means including means for deriving said scores by searching and operating on said text information to determine the relationships in said message components between one or more specified words, one of said numerical scores independently determined for each of said message components based on said relationships to indicate the extent to which each said message component favors its said corresponding position so that the value of each said numerical score is independent of the value of other scores determined for said text information;

said software means further including:

means for maintaining in said storage medium said numerical scores in digital form together with an indication of the appearance dates of the corresponding said message components; and means for determining changes in sizes of said two or more subpopulations over time from a predetermined subpopulation size at a starting time, said changes in subpopulation size at a starting time, wherein said changes in subpopulation size are determined by determining the conversion of individuals from one subpopulation to another, and wherein said conversion is determined according to one or more conversion functions defining the transfer of individuals from one subpopulation to another corresponding to said numerical scores of said message components occurring subsequent to said starting time whereby changes in opinion of said members of said population over time may be calculated based on the content of said representative set of messages.

53. The system according to claim 52 wherein:
   (a) said means for determining changes includes means for using said numerical scores to construct mathematical functions defining the extent said message components support said specified two or more positions; and wherein
   (b) said means for determining changes further includes construction of functions based on said subpopulation size.

54. The system according to claim 53 wherein said means for determining optimizes said specifications by minimizing the differences in the squares of the deviations between calculated opinion values and specified opinion values.

55. The system according to claim 53 wherein said means for determining optimizes said specifications by achieving specified small differences over a specified time interval between calculated opinion values for two or more calculations beginning with widely disparate initial opinion values.

56. The system according to claim 53 wherein said functions include a weighting term compensate for message components which reinforce opinions already held.

57. The system according to claim 53 wherein said functions include a weighting term to compensate for the diminished power to change said specified population's opinion due to additional message components supporting a position as the total amount of message components favoring a position within said time increases.

58. The system according to claim 53 wherein said functions permit different numerical scores corresponding to different message components within the same message having different weights.

59. The system according to claim 58 wherein said mathematical functions depend upon;
   (a) the sources of the message components with said scores wherein the sources of said message components are the author of said message components or quoted authors or speakers of said message components, or are unavailable;
   (b) the audience sizes of the message components with said scores wherein the audience sizes reflect the approximate number of persons to which said message components are distributed;
   (c) the reputations of the media carrying the message components with said scores wherein the reputations of the media reflect the reliability and trustworthiness of the media transporting the message components to said audience;
   (d) the degrees of the directness of the message components with said scores wherein the degrees of directness reflect the explicitness with which said message component relate to said issue;
   (e) the contents in favor of different positions for the message components with said scores wherein of message can contain multiple message components favoring a plurality of positions on said issue.

60. The system according to claim 53 wherein said functions reflecting an exponential loss in the extent a message component is diminished in its capacity to cause said changes in said subpopulation sizes as time proceeds.

61. The system according to claim 53 wherein said specifications are that increased numerical scores corresponding to one of said specified two or more positions leads to increased opinion change in a population susceptible to said message components.

62. The system according to claim 53 wherein said specifications are that the change in opinion toward one of said specified two or more positions due to information corresponding to numerical scores favoring a specified position increases with the number of people in a specified target subpopulation susceptible to said information.

63. The system according to claim 53 wherein said specifications are that the number of people forgetting about said specified issue increases in proportion to the number of people aware of said issue.

64. The system according to claim 52 wherein said means for determining includes a list of possible population conversions wherein each entry in the list further comprises:
   (a) a specified mathematical function describing the extent said message components are able to favor a specified position;
   (b) a specified target subpopulation of said specified population whose opinion can be changed according to said mathematical function; and
   (c) a specified destination subpopulation of said specified population to which members of said target subpopulation are converted after the action of the said text message components as specified by said mathematical function.

65. The system according to claim 52 wherein said changes are determined by:
   (a) beginning with specified initial opinion values at a specified initial time wherein an opinion value reflects the portion of said population favoring the said position on said specified issue; and
   (b) proceeding by calculating opinions values at subsequent times in a series of iterative steps wherein the opinions at specified times are used to calculate opinion values at specified later times.

66. The system according to claim 49, 50, 51 or 52 wherein the size of said predetermined subpopulation is obtained from a poll of public opinion specifying the number of members of each said specified subpopulation of said specified population on said starting time.

67. The system according to claim 52, 53, 64, 65, 54, 55, 56, 57, 58, 59, 60, 61, 62 or 63 wherein said message components include representative text messages and wherein said means for acquiring includes selecting an homogeneous text wherein the reduced text contains only words used with limited meanings and limited ambiguity before determining said numerical scores.

68. The system according to claim 67 wherein said means for reducing the text further includes means for:
   (a) dividing the text of said message into specified blocks of text;
   (b) making summary representations of individual blocks of text wherein each important concept conveyed by said specified block of text is reduced to a single concept symbol, and wherein each said concept is identified from:
(1) one or more specified words within said specified block of text,
(2) a quantity of text between said specified words within said specified block of text, and
(3) the sequence within said specified block of text of said specified words;
(c) determining, based on said summary representations:
(1) which representative block of text to be used to determine numerical scores for said message, and
(2) numerical scores for said message.

69. The system according to claim 68 wherein said software means for making said summary representations from said specified blocks of text further includes means for causing said computer to:
(a) alter said summary representations based on said specified blocks of text and specified input rules, wherein said input rules specify one or more concept symbols to insert and the method for their insertion within said summary representation, and
(b) alter individual said specified blocks of text, based on other text blocks and specified input rules, wherein said input rules specify one or more words to insert and locations within said individual text blocks for their insertion.

70. The system according to claim 53 wherein said calculations of expected opinion of members of said specified population are a product of said functions describing the subpopulation size and said functions based on numerical scores.

71. A system for processing information to determine time trends of measurable social traits for which members of a specified population can be placed into distinct and mutually exclusive subpopulations of said specified population each corresponding to two or more specified positions wherein said numerical scores are derived from a representative set of message components used by said specified population over time for making decisions about said social traits over time, said systems comprising:
a digital computer including a digital storage means and software means operable in said computer for determining numerical scores representing message components conveyed within said text information wherein each of said message components favors one corresponding position of said specified two or more positions wherein said numerical scores are derived from a representative set of said message components used by said population over time for formulating opinions on said two or more positions, said software means including means for deriving said scores by searching and operating on said text information to determine the relationships in said message components between one or more specified words, one of said numerical scores determined independently for each of said message components based on said relationships to indicate the extent to which each said message component favors its corresponding said position so that the value of each said numerical score is independent of the value of the other numerical scores determined for said text information;
said software means further including:
means for maintaining in said storage means said numerical scores in digital form together with an indication of the appearance dates of the corresponding said message components; and
means for determining changes in sizes of said two or more subpopulations over time from a predetermined subpopulation size at a starting time, said changes in subpopulation size at a starting time, wherein said changes in subpopulation size are determined by determining the conversion of individuals from one subpopulation to another, and wherein said conversion is determined according to one or more conversion functions defining the transfer of individuals from one subpopulation to another corresponding to said numerical scores of said message components occurring subsequent to said starting time whereby changes in opinion of said members of said population over time may be calculated based on the content of said representative set of messages.

72. A system according to claim 71 wherein said numerical scores are further deduced from specified patterns of societal behavior.

73. The system according to claim 72 wherein said deduction further reflects increases in message components in favor of a position as increases occur in the number of individuals within said population adopting the social trait corresponding to said position.

74. The system according to claim 72 where said deduction further reflects changes in message components in favor of a position depending on the time when members of said specified subpopulation had undergone an earlier social change.

75. The system according to claim 74 wherein different message components act on different subgroups within said specified subpopulation wherein all members of said population have the same social trait.

76. The system according to claims 71, 72, 73, 74 or 75 wherein:
(a) said means for determining includes means for using said numerical scores to construct mathematical functions defining extent said message components support specified positions; and wherein
(b) said means for determining includes specifications to further include construction of functions based on said sizes of subpopulations holding different social traits.

77. The system according to claim 71, 74, 75, 76 or 77 wherein said means for determining include a list of possible populations conversions wherein each entry in the list further comprises:
(a) a specified mathematical function describing the extent said message components favor a specified position;
(b) a specified target subpopulation of said specified population whose social trait can be changed as predicted by said mathematical function; and
(c) a specified destination subpopulation of said specified population to which members of said target population are converted after the action of said text message components as predicted by said mathematical function.

78. The system according to claim 77 wherein said message components include representative text messages and wherein said means for acquiring includes means for reducing the text of said message by removal of text irrelevant to said issue and to provide an homogeneous text wherein the reduced text contains only words used with limited meanings and limited ambiguity before determining said numerical scores.

79. The system according to claim 78 wherein said software means for reducing the text includes means for:
(a) dividing the text of said message into specified blocks of text;
(b) making summary representations of individual blocks of text is reduced to a single concept symbol, and wherein each said concept is identified from:
(1) one or more specified words within said specified block of text,
(2) a quantity of text between said specified words within said specified block of text, and
(3) the sequence within said specified block of text of said specified words;
(c) determining, based on said summary representations:
(1) which representative a block of text to be used to determine numerical scores for said message, and
(2) numerical scores for said message.

80. The system according to claim 79 wherein said software means for making said summary representations from said specified blocks of text further includes means for causing said computer to:
(a) alter said summary representations based on said specified blocks of text and specified input rules, wherein said input rules specify one or more concept symbols to insert and the method for their insertion within said summary representation, and
(b) alter individual said specified blocks of text, based on other text blocks and specified input rules, wherein said input rules specify one or more words to insert and locations within said individual text blocks for their insertion.

81. The system according to claim 71, 72, 73, 74 or 75 wherein said changes are determined by:
(a) beginning with specified initial social trait values at a specified initial time wherein a social trait value reflects the portion of said population exhibiting like behavior expressing like views on said issue; and
(b) proceeding by calculating said social traits values at subsequent times in a series of iterative steps wherein the social traits at specified times are used to calculate social trait values at specified later times.

82. The system according to claim 81 wherein said message components include representative text messages and wherein said means for acquiring includes means for reducing the text of said message by removal of text irrelevant to said issue and to provide an homogeneous text wherein the reduced text contains only words used with limited meanings and limited ambiguity before determining said numerical scores.

83. The system according to claim 82 wherein said software means for reducing text includes means for:
(a) dividing the text of said message into specified blocks of text;
(b) making summary representations of individual blocks of text is reduced to a single concept symbol, and wherein each said concept is identified from:
(1) one or more specified words within said specified block of text,
(2) a quantity of text between said specified words within said specified block of text, and
(3) the sequence within said specified block of text of said specified words;
(c) determining, based on said summary representations:
(1) which representive a block of text to be used to determine numerical scores for said message, and
(2) numerical scores for said message.

84. The system according to claim 83 wherein said software means for making said summary representations from said specified blocks of text further includes means for causing said computer to:
(a) alter said summary representations based on said specified blocks of text and specified input rules, wherein said input rules specify one or more concept symbols to insert and the method for their insertion within said summary representation, and
(b) alter individual said specified blocks of text, based on the other text blocks and specified input rules, wherein said input rules specify one or more words to insert and locations within said individual text blocks for their insertion.

85. The system according to claims 71, 72, 73, 74 or 75 wherein said message components include representative text messages and wherein said means for acquiring includes selecting an homogeneous text wherein the reduced text contains only words used with limited meanings and limited ambiguity before determining said numerical scores.

86. The system according to claim 85 wherein said software means for reducing the text includes means for:
(a) dividing the text of said message into specified blocks of text;
(b) making summary representations of individual blocks of text is reduced to a single concept symbol, and wherein each said concept is identified from:
(1) one or more specified words within said specified block of text,
(2) a quantity of text between said specified words within said specified block of text, and
(3) the sequence within said specified block of text of said specified words;
(c) determining, based on said summary representations:
(1) which representive a block of text to be used to determine numerical scores for said message, and
(2) numerical scores for said message.

87. The system according to claim 86 wherein said software means for making said summary representations from said specified blocks of text further includes means for causing said computer to:
(a) alter said summary representations based on said specified blocks of text and specified input rules, wherein said input rules specify one or more concept symbols to insert and the method for their insertion within said summary representation, and
(b) alter individual said specified blocks of text, based on other text blocks and specified input rules, wherein said input rules specify one or more words to insert and locations within said individual text blocks for their insertion.

88. The system according to claim 76 wherein said means for determining optimizes said specifications by minimizing the differences in the squares of the deviations between calculated social trait values and specified social trait values.

89. The system according to claim 76 wherein said functions include a weighting term compensate for specified message components which reinforce specified social traits.

90. The system according to claim 76 wherein said functions include a weighting term to compensate for the diminished power to cause said conversions as the total quantity of numerical scores favoring one of said specified two or more positions within said time increases.

91. The system according to claim 76 wherein said mathematical functions depend upon:
(a) the sources of the message components with said scores wherein the sources of said message components are the author of said message components or quoted authors or speakers of the message components, or are unavailable;
(b) the audience sizes of the message components with said scores wherein the audience sizes reflect the approximate number of persons to which said message components are distributed;
(c) the reputations of the media carrying the message components with said scores wherein the reputations of the media reflect the reliability and trustworthiness of the media transporting the message components to said audience;
(d) the degrees of the directness of the message components with said scores wherein the degrees of directness reflect the explicitness with which said message component relate to said issue;
(e) the contents of the message components with said scores wherein contents in favor a different positions includes messages containing multiple message components and said message components each favor positions on said issue.

92. The system according to claim 76 wherein said functions reflect an exponential loss in the extent a message component is diminished in its capacity to cause said changes in said subpopulation sizes as time proceeds.

93. The system according to claim 76 wherein said specifications are that increased numerical scores corresponding to one of said specified two or more positions leads to increased opinion change in a population susceptible to said message components.

94. The system according to claim 76 wherein said specifications are that the change in opinion toward one of said specified two or more positions due to message components corresponding to numerical scores favoring a specified position increases with the number of people of specified subpopulation susceptible to said message components.

95. The system according to claim 76 wherein said specifications are that the number of people forgetting about said specified issue increases in proportion to the number of people aware of said issue.

96. The system according to claim 76 wherein said message components include representative text messages and wherein said means for acquiring includes means for reducing the text of said message by removal of text irrelevant to said issue to provide an homogeneous text wherein the reduced text contains only words used with limited meanings and limited ambiguity before determining said numerical scores.

97. The system according to claim 96 wherein said software means for reducing the text includes means for:
(a) dividing the text of said message into specified blocks of text;
(b) making summary representations of individual blocks of text is reduced to a single concept symbol, and wherein each said concept is identified from:
(1) one or more specified words within said specified block of text,
(2) a quantity of text between said specified words within said specified block of text, and
(3) the sequence within said specified block of text of said specified words;
(c) determining, based on said summary representations:
(1) which representive a block of text to be used to determine numerical scroes for said message, and
(2) numerical scores for said message.

98. The system according to claim 97 wherein said software means for making said summary representations from said specified blocks of text further includes means for causing said computer to:
(a) alter said summary representations based on said specified blocks of text and specified input rules, wherein said input rules specify one or more concept symbols to insert and the method for their insertion within said summary representation, and
(b) alter individual said specified blocks of text, based on other text blocks and specified input rules, wherein said input rules specify one or more words to insert and locations within said individual text blocks for their insertion.

99. The system according to claim 71 wherein said means for determining optimizes said specifications by achieving specified small differences over a specified time interval between calculated social trait values for two or more calculations beginning with widely disparate initial subpopulation sizes for said social traits.

100. The system according to claims 88, 99, 89, 90, 24, 91, 92, 93 wherein said message components include representative text messages and wherein said means for acquiring includes means for reducing the text of said message by removal of text irrelevant to said issue and to provide an homogeneous text wherein the reduced text contains only words used with limited meanings and limited ambiguity before determining said numerical scores.

101. The system according to claim 100 wherein said software means for reducing the text includes means for:
(a) dividing the text of said message into specified blocks of text;
(b) making summary representations of individual blocks of text is reduced to a single concept symbol, and wherein each said concept is identified from:
(1) one or more specified words within said specified block of text,
(2) a quantity of text between said specified words within said specified block of text, and
(3) the sequence within said specified block of text of said specified words;
(c) determining, based on said summary representations:
(1) which representive a block of text to be used to determine numerical scores for said message, and
(2) numerical scores for said message.

102. The system according to claim 10 wherein said software means for making said summary representations from said specified blocks of text further includes means for causing said computer to:
(a) alter said summary representations based on said specified blocks of text and specified input rules, wherein said input rules specify one or more concept symbols to insert and the method for their insertion within said summary representations for their insertion, and
(b) alter individual said specified blocks of text, based on other text blocks and specified input rules, wherein said input rules specify one or more words to insert and locations within said individual text blocks for their insertion.

103. A system for processing information to determine expected opinion of members in a specified population for a specified issue with two or more specified positions, said population including two or more subpopulations each favoring one of said two or more specified positions, comprising:
a digital computer including communications means for electronically connecting said computer to an electronic database containing text stored in digital form, said text organized in messages including text message components used by said members of said population over time for formulating opinions on said two or more positions;
said computer further including:
(a) means for selectively searching said database according to predetermined criteria to collect, for said issue, messages used by the public over time for formulating opinions on said positions;
(b) means for selecting from each message a plurality of blocks of text relevant to said specified issue;
(c) means for assigning numerical scores to relevant blocks of text in said messages according to which said positions said blocks of text favor and the appearance dates of the corresponding stories;
(d) means for assigning a message numerical score of each of said messages according to said numerical scores assigned to said relevant blocks of text found therein;
(e) means for weighting said numerical scores assigned to said relevant blocks of text based on indexed text message components found therein according to one or more predetermined functions wherein said indexed text message components are portions of said block of text of said messages favoring one of said two or more positions on said issue indexed according to location within said blocks of text and the time of appearance of said message;
(f) means for determining changes in sizes of said two or more subpopulations over time from sizes of said two or more initial subpopulations, said changes in subpopulation size determined by determining the conversion of individuals from one subpopulation to another, said conversion determined according to one or more conversion functions defining the transfer of individuals from one subpopulation to another corresponding to the appearance dates and said numerical scores for said messages occurring subsequent to said starting time whereby changes in opinions of members of said population over time may be predicted based on the content of said representative set of stories.

104. The system of claim 103 wherein said means for assigning said numerical scores includes means for assigning a score to each message for each different one of said specified two or more positions and wherein said means for scoring includes means for scoring each of said messages according to:
(a) the sources of the message components with said scores wherein the sources of said message components are the author of said components, or quoted authors or speakers, or are unavailable;
(b) the audience sizes of the message component with the said scores wherein the audience sizes reflect the approximate number of persons to which the said message components are distributed;
(c) the reputations of the media carrying the message component with said scores wherein the reputations of media reflect the reliability and trustworthiness of the media transporting said message component to said audience;
(d) the degrees of directness of the message components with said scores wherein the degrees of directness reflect the explicitness to which said message component relate to the issue; and
(e) the contents of the message components with said scores wherein said contents in favor of each message component reflects the extent said message component supports positions on said issue.

105. The system according to claim 104 wherein said means for weighting said message scores includes means for maintaining an array of weighting functions, said weighting functions depending on the number of said two or more specified positions indicated by said message scores and the subpopulations for which opinion changes are calculated.

106. A system for reducing a text message organized in text blocks to its essential message components favoring one or more specified positions on a specified issue and assigning numerical scores to said message representing the extent to which said message favors one or more predetermined ideas wherein the text of said message is represented in digital form and includes message components in a human language, said system comprising:
a computer, said computer including a digital storage means of holding the text of said message and software means operable on said computer to cause the computer to reduce the text of said message by removal of text irrelevant to said predetermiined ideas before determining said numerical scores, wherein the remaining text is homogeneous, and the remaining words are used with limited meanings and limited ambiguity by:
(1) dividing the text of said message into said specified blocks of text;
(2) making summary representations of individual blocks of text wherein each important concept conveyed by said text is reduced to a single concept symbol, and wherein each said concept is identified from:
(a) one or more specified words within said specified block of text,
(b) a quantity of text between said specified words within said specified block of text, and
(c) the sequence within said specified block of text of said specified words;
(3) determine, based on said summary representations (a) which representative blocks of text to use to determine the numerical scores for said message, and (b) numerical scores for said message.

107. A system for processing text information to determine expected opinion of members in a specified population for a specified issue with two or more specified positions, said population including two or more subpopulations each favoring one of said two or more specified positions, said system comprising:

a digital computer including a digital storage means and software means operable in said computer for determining numerical scores representing message components conveyed within said text information wherein each of said message components favors one corresponding position of said specified two or more positions wherein said numerical scores are derived from a representative set of said message components used by said population over time for formulating opinions on said two or more positions, said software means including means for deriving said scores by searching and operating on said text information to determine the relationships in said message components between one or more specified words, one of said numerical scores independently determined for each of said message components based on said relationships to indicate the extent to which each said message component favors its corresponding said position so that the value of each said numerical score is independent of the value of other numerical scores determined by said text information;

said software means further including:

means for maintaining in said storage means said numerical scores in digital form together with an indication of the appearance dates of the corresponding said message components; and means for determining changes in sizes of said two or more subpopulations over time from a predetermined subpopulation size at a starting time, said changes in subpopulation size at a starting time, wherein said changes in subpopulation size are determined by determining the conversion of individuals from one subpopulation to another, and wherein said conversion is determined according to one or more conversion functions defining the transfer of individuals from one subpopulation to another corresponding to said numerical scores of said message components occurring subsequent to said starting time whereby changes in opinion of said members of said population over time may be calculated based on the content of said representative set of messages wherein:

(1) said means for determining includes means for using said numerical scores to construct mathematical functions defining the extent said message components support said specified two or more positions: and wherein (2) said means for determining further includes construction of functions based on said subpopulation size.

108. A system for processing information to determine time trends of measurable social traits for which members of a specified population can be placed into distinct and mutually exclusive subpopulations of said specified population each corresponding to two or more specified positions wherein said numerical scores are derived from a representative set of message components used by said specified population over time for making decisions about said social traits over time, said systems comprising:

a digital computer, said computer including:

(a) a digital storage medium;

(b) means for acquiring into said storage medium said numerical scores in digital form, said scores representative of the extent to which each of said message components favor each of said specified two or more positions so that there is an independent numerical score of each of said message components reflecting the extent to which each said message component favors said corresponding position and wherein the value of each said numerical score is independent of the value of scores of other said message components, and further including an indication of the appearance dates of the corresponding said message components;

(c) means for determining changes in sizes of said two or more subpopulations over time from a predetermined subpopulation size at a starting time, said changes in subpopulation size at a starting time, wherein said changes in subpopulation size are determined by determining the conversion of individuals from one subpopulation to another, and wherein said conversion is determined according to one or more conversion functions defining the transfer of individuals from one subpopulation to another corresponding to said numerical scores of said message components occurring subsequent to said starting time whereby changes in opinion of said members of said population over time may be predicted based on the content of said representative set of messages;

(d) means to deduce numerical scores from specified patterns of social behavior wherein increases in the number of members of said specified population with said subpopulation adopting a social trait corresponding to one of said two or more specified positions is a predicted result of an increase in message components favoring said position.

109. A method for determining expected time trends in opinions held by members of a specified population about a specified issue based on text messages received and used by said population in forming sid opinions. wherein said text messages contain specified components favoring one or two or more specified positions on said specified issue, said method comprising the steps of:

a. electronically searching said text messages for one or more specified words and determining the relationship between said specified words to identify said message components and the extent to which each of said message components favor a corresponding one of each of said specified positions.

b. dividing said population into two or more specified subpopulations, wherein one of said two or more specified subpopulations is unaware of said issue. and wherein, each of the other said two or more specified subpopulations contain members holding opinions corresponding to one of said two or more specified positions on said issue, and c. determining expected time trends of the sizes of said two or more subpopulations by i. beginning with specified sizes for of each said two or more subpopulations at a specified initial time, and ii. proceeding by determining said sizes in a series of interactive steps representing different times wherein the said subpopulation sizes at specified times are used to determine said subpopulation sizes at specified later times wherein said determination is based, for each specified subpopulation, on:
a. conversions among members of specified subpopulations due to the action of message components favoring specified position on said issue wherein said positions can correspond to:
  i. the opinions of said subpopulation on said issue, and
  ii. the opinions held by other subpopulations of said population,
b. conversion of members of said population from unawareness of said issue to favoring said specified subpopulation's position on said issue, and
c. conversion of members of said specified subpopulation to unawareness of said issue through forgetting about said issue; and
further wherein said determination is made by solving the following mathematical formula:

$$\frac{dS(t)}{dt} = R(t) - L(t) + U(t) - U'(t)$$

Wherein:
t represents time,
S(t) is a vectored function representing the distribution of all members of said populations into said two or more subpopulations at a time "t",
R(t) is a vectored function representing a recruitment of members of said population into each specified subpopulation from other subpopulations based on persuasive message components favoring each said specified subpopulation's position on said issue over time from said specified initial time to time "t",
L(t) is a vectored function representing a loss of members from each specified subpopulation to other subpopulations of said population based on persuasive message components favoring other subpopulation's position on said issue over time from said specified initial time to time "t",
U(t) is a vectored function representing addition of members of said population to each specified subpopulation based on conversion of members from unawareness of said issue to belief in said specified subpopulation's position based on persuasive message components favoring said position over time from said specified initial time to time "t", and
U'(t) is a vectored function representing the number of members of each specified subpopulation who become unaware of said issue over time from said specified initial time to time "t".

110. The method in claim 109 wherein said mathematical formula:

$$\frac{dS(t)}{dt} = R(t) - L(t) + U(t) - U'(t)$$

is further defined by:

$$S(t) = A(t) \cdot B_j(t)$$

-continued $$R(t) = \sum_{j',r} k_{2j'rj} \cdot H_{j'}(t) \cdot A(t) \cdot B_j(t)$$

$$L(t) = \sum_{j',r} k_{2jjr'} \cdot H_{j'}(t) \cdot A(t) \cdot B_j(t)$$

$$U(t) = \sum_{j} k_{2jj} \cdot F_j(t) \cdot (1 - A(t))$$

$$U'(t) = u \cdot A(t) \cdot B_j(t)$$

thus:

$$\frac{d[A(t) \cdot B_j(t)]}{dt} = \sum_{j',r} k_{2j'rj} \cdot H_{j'}(t) \cdot A(t) \cdot B_r(t) - \sum_{j',r} k_{2jjr'} \cdot$$

$$H_{j'}(t) \cdot A(t) \cdot B_j(t) + \sum_j k_{1jj} \cdot F_j(t) \cdot (1 - A(t)) - u \cdot A(t) \cdot B_j(t)$$

and wherein:
A represents a vectored function, indexed by the number of said two or more positions on said issue, and dependent only on the variable "t", time; this function returns the number of members in said population that are aware of said issue;
B represents a vectored function, indexed by the number of said two ore more positions on said issue, and dependent only on the variable "t", time; this function returns the number of members of said population that are aware of said issue ("A") who also believe or favor one of said two or more said positions on said issue;
t represents time;
j is an index variable, with j=1, 2 ... n, for "n" number of said two or more positions on said issue;
j' is an index variable, where (j'=1, 2 ... n) ∩ (j'≠j)j
r is an index variable representing the members of said population who are members of said two or more subpopulations other than said subpopulation described by said mathematical formula, said members are susceptible to recruitment to said subpopulation by the persuasive properties of said message components;
k2 represents a vectored constant of "persuasiveness" of said messages; it is indexed by said two or more positions on said issue, and compensates for the persuasive effect on said population that said messages have on the population irrespective the effects of interactions between messages;
k1 represents a vectored constant of "attentiveness" for the members of said population who are unaware of said issue; it is indexed by said two or more positions on said issue, and compensates for the capacity of unaware members of said population to be persuaded by said messages;
H represents a vectored function which describes the persuasive effect of said message on the opinions of said members of said population and which compensates for the effects of interactions between some of said messages; it is indexed by the said two or more and by a measure of susceptibility to recruitment to said subpopulation;
F represents a vectored function describing the persuasive effects of said messages on the opinions of members of said population who are unaware of said issue; it is indexed by the constant representing the members of said population who are unaware of said issue.

* * * * *